US012061945B1

(12) United States Patent
Mosteller et al.

(10) Patent No.: US 12,061,945 B1
(45) Date of Patent: Aug. 13, 2024

(54) ILLUMINABLE WEIGHTED CARD

(71) Applicant: CPI CARD GROUP—COLORADO, INC., Littleton, CO (US)

(72) Inventors: Barry Mosteller, Castle Pines, CO (US); Diana Walter, Centennial, CO (US); Jim Colleran, Centennial, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 0 days.

(21) Appl. No.: 18/566,493

(22) PCT Filed: Jun. 2, 2022

(86) PCT No.: PCT/US2022/031935
§ 371 (c)(1),
(2) Date: Dec. 1, 2023

(87) PCT Pub. No.: WO2022/256511
PCT Pub. Date: Dec. 8, 2022

Related U.S. Application Data

(60) Provisional application No. 63/195,753, filed on Jun. 2, 2021.

(51) Int. Cl.
*G06K 19/07* (2006.01)
*G06K 19/077* (2006.01)

(52) U.S. Cl.
CPC . *G06K 19/07705* (2013.01); *G06K 19/07722* (2013.01)

(58) Field of Classification Search
CPC ............... G06K 19/07705; G06K 19/07722
USPC ........................................................ 235/492
See application file for complete search history.

(56) References Cited

U.S. PATENT DOCUMENTS

| 7,334,735 B1* | 2/2008 | Antebi ................... G06F 21/35 235/492 |
|---|---|---|
| 2015/0269477 A1 | 9/2015 | Finn et al. |
| 2018/0343741 A1 | 11/2018 | Williams et al. |
| 2020/0160135 A1 | 5/2020 | Lowe |
| 2021/0056371 A1 | 2/2021 | Mosteller |
| 2021/0110230 A1 | 4/2021 | Cheng |

(Continued)

OTHER PUBLICATIONS

U.S. Patent and Trademark Office, "International Search Report and Written Opinion," mailed Oct. 6, 2022, for PCT Application No. PCT/US2022/031935, 21 pages.

*Primary Examiner* — Daniel A Hess
(74) *Attorney, Agent, or Firm* — Dorsey & Whitney LLP

(57) ABSTRACT

An illuminable metal card includes a metal member, an electrically non-conductive surround member having an opening, the metal member is disposed in the opening, and the metal member and surround member define at least a portion of an inlay. The card further includes electrically conductive first and second contact rails, spaced apart from one another on a side of and in non-contact relation to the metal member, for receiving an electrical signal, and an illuminable patch, located on the first side of and in non-contact relation to the metal member, for electrical coupling with the first and second contact pads to illuminate upon receipt of an electrical signal at the first and second contact rails. The card may include at least one antenna to receive a contactless signal.

17 Claims, 12 Drawing Sheets

(56) References Cited

U.S. PATENT DOCUMENTS

2023/0297980 A1* 9/2023 Glaser .................... G06F 3/016
                                                   235/492

* cited by examiner

ILLUMINABLE WEIGHTED CARD

CROSS REFERENCE TO RELATED APPLICATIONS

This application is a national stage application under 35 U.S.C. § 371 of International Application No. PCT/US2022/031935, filed Jun. 2, 2022, entitled "ILLUMINABLE WEIGHTED CARD," which claims priority to U.S. Patent Application No. 63/195,753, filed Jun. 2, 2021, the contents of all of which are hereby incorporated herein in their entirety by reference for all purposes.

BACKGROUND

Single panel cards, and in particular cards sized for ready stowage in and retrieval from a wallet or purse, are employed for a wide variety of purposes. For example, such cards may take the form of collector cards, access cards, identity cards, loyalty cards, membership cards, transit cards and transaction cards (e.g. credit, debit and gift cards). Such cards are often associated with a given financial institution and/or merchant of goods and/or services who issues or otherwise promotes the distribution/use of such cards. In turn, such cards often comprise discernible and/or functional features unique to or otherwise associable with a corresponding merchant and/or financial institution, thereby enhancing consumer brand recognition and goodwill in relation to the merchant and/or financial institution.

In an effort to distinguish one card from another, cards of the described nature have incorporated increasingly creative features. However, such features often entail significant additional card production expense, thereby curtailing widespread implementation. For example, implementation of such features may entail a degree of customization that is simply too expensive for limited or even widespread card distributions by smaller or otherwise cost-conscience financial institutions and merchants. And, incorporation of such creative features often accomplishes only a single one of two competing objectives, i.e. discernible card differentiation or functional card differentiation.

SUMMARY

The present disclosure encompasses embodiments of improved cards and production methodologies that facilitate the combined implementation of creative visual/functional illumination features and card weighting features, while also providing both card customization and card production efficiencies.

In some embodiments, an improved card comprises a metal member having a weight that is at least 40% of a total weight of the card, and an electrically non-conductive surround member having an opening, wherein the metal member is disposed in the opening, and wherein the metal member and surround member may define at least a portion of an inlay. Electrically conductive first and second contact rails may be located in spaced relation to one another on a first side of and electrically isolated from the metal member, for receiving an electrical signal. Additionally, an illuminable patch may be located on the first side of and electrically isolated from the metal member, for electrical coupling with the first and second contact rails to illuminate upon receipt of an electrical signal at the first and second contact rails. At least a portion of such illumination may be visible at a first side of the card and/or along one or more peripheral edges of the card.

The card may further comprise a first antenna (e.g. at least one or a plurality of electrically-conductive metal loops), electrically isolated from the metal member and electrically interconnected at offset locations thereof to different ones of the first and second contact rails, for receiving a contactless signal and providing a first electrical signal to the first and second contact rails in response thereto (e.g. an AC signal). The contactless signal may comprise radio frequency electromagnetic radiation signals.

In typical implementations, the card may further comprise an electrically non-conductive first core layer located on the first side of the metal member and overlying the first and second contact rails and the illuminable patch, and an electrically non-conductive a second core layer located on a second side of the metal member, opposite to the first side thereof. In some arrangements, the first core layer may be light transmissive (e.g. transparent or translucent), wherein light emitted by the illuminable patch is visible from a first side of the card. The first core layer and/or the second core layer may have a corresponding first printing and/or second printing printed thereupon, respectively.

In some embodiments, the card may also include a mask overlying at least a portion of the illuminable patch and defining a predetermined visible image on the first side of the card upon illumination of the illuminable patch. In that regard, the mask may have a configuration that blocks passage of a first portion of light emitted by the illuminable patch and permits passage of a second portion of light emitted by the illuminable patch. By way of example, the predetermined visible image may correspond with a name, logo, character, graphics or other visual representation associated with or otherwise selected by a given entity. Optionally, the mask may be defined as part of the first printing printed on the first core layer.

In contemplated embodiments, the first and second contact rails may be supportably interconnected to an electrically non-conductive first carrier layer located between the metal member and the first core layer on the first side of the metal member. Optionally, the first and second contact rails may each have a corresponding length that is greater than a maximum cross-dimension of the illuminable patch, thereby accommodating placement of the illuminable patch along a continuum of positions between and along the first and second contact rails during production. In that regard, opposing edge portions of said first and second contact rails may have corresponding lengths in a first dimension that are each greater than a maximum cross-dimension of the illuminable patch in said first dimension. Further, opposing edge portions of the first and second contact rails may extend coincidentally and/or in equispaced relation along the corresponding lengths thereof. For example, opposing edge portions of the first and second contact rails may extend in substantially parallel relation along the corresponding lengths thereof.

In one approach, a rectangular card may be provided, wherein the opposing edge portions of the first and second contact rails extend in parallel relation to a peripheral edge of the card. For example, the opposing edge portions of the first and second contact rails may extend parallel to a length edge or a width edge of the card, thereby accommodating illuminable patch positioning at a plurality of different locations along the length or the width of the card.

In some implementations, the first and second contact rails may each have a corresponding substantially constant width along the corresponding lengths thereof. In one approach, the first and second contact rails may have the same width along the corresponding lengths thereof. Further, the first and second contact rails may have substantially equal corresponding lengths.

In some embodiments, the card may be provided as a contactless chip card for contactless interface with a contactless chip card reader (e.g. for use as a transaction card), wherein the card includes an integrated circuit (IC) chip module that is located in a pocket that extends through the first core layer and that includes an integrated circuit (IC) chip supportably interconnected to an inward-facing side of a substrate. In such embodiments, the first antenna may be electrically interconnected at first offset locations thereof to the first and second contact rails by different ones of an electrically-conductive first pair of connection lines, and an electrically-conductive second pair of connection lines may be electrically interconnected at second offset locations of the first antenna for electrical coupling with different ones of a first pair of a plurality of electrical contacts of the integrated circuit chip to provide the first electrical signal thereto (e.g. via direct contact or inductive coupling). In such arrangements, the first electrical signal may be employed for both illumination of the illuminable patch and operation of the integrated circuit chip, including transmission of contactless signals from the card to a contactless chip card reader utilizing the first antenna.

In some implementations the card may be provided as a dual interface chip card for added contact interface functionality with a contact chip card reader (e.g. for use as a transaction card), wherein the IC chip module further includes a plurality of contact plates, supportably interconnected to an outward-facing side of the substrate, for receiving a contact, second electrical signal (e.g. a DC signal). The plurality of contact plates may be electrically interconnected through the substrate to a corresponding plurality of contacts supportably interconnected to the inward-facing side of the substrate and electrically interconnected to different ones of the plurality of electrical contacts of the IC chip to provide the second electrical signal thereto. The IC chip module may also include a pair of contact pads supportably interconnected to an inward-facing side of the substrate and electrically interconnected to different ones of a pair of the plurality of contacts that are electrically interconnected to different ones of a second pair of the plurality of electrical contacts of the integrated circuit chip, different from the first pair thereof, wherein different ones of the pair of contact pads are electrically interconnected via different ones of a third pair of interconnection lines to different ones of the first and second contact rails to provide the second electrical signal thereto. In such arrangements, the second electrical signal may be employed for both illumination of the illuminable patch and operation of the integrated circuit chip, including transmission of contact signals from the card to a contact chip card reader utilizing the IC chip module.

In conjunction with such embodiments, each of the first pair of connection lines that electrically interconnect the first antenna to different ones of the first and second contact rails may include an in-line capacitor to isolate the first antenna from the second electrical signal (e.g. DC signal of contact signal). Additionally, at least one or both of the third pair of connection lines that electrically interconnect the pair of contact pads of IC chip module to different ones of the first and second contact rails may include an in-line diode to isolate the IC chip from the first energy signal (e.g. AC signal from contactless signal).

In a first antenna approach, the first antenna may be supportably interconnected to an inward-facing first side of the first carrier layer, in non-overlapping relation to the metal member, and the first and second contact rails and the first and second pairs of connection lines may be supportably interconnected to the first side of the first carrier layer. In turn, each of the third pair of connection lines may include a corresponding first portion supportably interconnected to the first side of the first carrier layer, a corresponding bridge extending through the first carrier layer, and a corresponding second portion supportably interconnected to an outward-facing second side of the first carrier layer with a corresponding metal pad connected thereto and located in contact with a different corresponding one of said pair of contact pads of the IC chip module. In the later regard, the metal pads may be at least partially embedded.

The first antenna, the first and second contact rails, the first pair of connection lines, the second pair of connection lines, and the third pair of connection lines may be defined by metallization, printed electrically-conductive ink, and/or combinations thereof. By way of example, the first antenna, the first and second contact rails, the first pair of connection lines, the second pair of connection lines and the third pair of connection lines may be defined by plated and etched aluminum and/or copper.

In conjunction with the first antenna approach, the illuminable patch may be supportably interconnected to an electrically non-conductive second carrier layer located between the metal member and the first carrier layer on the first side of the metal member, wherein the first and second contact rails and the illuminable patch are disposed in face-to-face relation between the first carrier layer and the second carrier layer. By way of example, the illuminable patch and a pair of electrical contacts may be printed on the second carrier layer, wherein different ones of the pair of electrical contacts are located for separate contact with different ones of the first and second contact rails for passage of an electrical signal.

Optionally, a phosphorescent patch may be provided in overlapping relation to the illuminable patch so as to fluoresce upon illumination of the illuminable patch. The phosphorescent patch may have substantially the same configuration as the configuration of the illuminable patch. In one approach, the phosphorescent patch may be supportably interconnected to the second carrier layer on the same side as the illuminable patch (e.g. in direct underlying relation to the illuminable patch). In another approach, the phosphorescent patch may be supportably interconnected to the opposing side of the second carrier layer.

In some embodiments, the card may comprise a translucent layer (e.g. a translucent, polymer-based material comprising an acrylic polymer, a polycarbonate polymer, or the like) that is located in overlapping relation to the illuminable patch, and that includes at least a portion that extends to a peripheral edge of the card. In turn, a portion of light emitted by the illuminable patch may be internally reflected within the translucent layer and directed to the peripheral edge of the card to illuminate such peripheral edge, thereby providing a distinctive feature to the card. In one approach, the translucent layer may comprise a sheet-like layer that extends to and about the entirety of the peripheral edge of the card. For example, when a rectangular illuminable card is provided, each of the length edges and width edges may be illuminated by the translucent layer upon illumination of the illuminable patch. Optionally, the translucent layer may comprise a fluorescent pigment, or dye. In various embodiments, the first carrier layer and/or the second carrier layer may be translucent to provide the translucent layer.

In a second antenna approach, the illuminable patch and the first and second contact rails may be supportably interconnected to the first carrier layer, and the first antenna may be supportably interconnected to an electrically non-conductive second carrier layer located on the second side of the metal member between the metal member and the second core layer, wherein the first antenna is disposed in non-overlapping relation to the metal member. In turn, the first pair of connection lines may extend around or through the metal member in electrical isolation therefrom.

In conjunction with some embodiments of the second approach, the first and second carrier layers may be defined by corresponding first and second portions of a single, continuous, electrically non-conductive substrate folded around a peripheral edge portion of the metal member. In turn, the illuminable patch, the first and second contact rails, a first portion of the first pair of connection lines, and the second pair of connection lines may be supportably interconnected to a first side of the substrate in the first portion thereof, and the first antenna and a second portion of the first pair of connection lines may be supportably interconnected to the same first side of the substrate in the second portion thereof.

The first antenna, the first and second contact rails, the first pair of connection lines, and the second pair of connection lines may be defined by metallization, printed electrically-conductive ink, and/or combinations thereof. By way of example, the first antenna, the first and second contact rails, the first pair of connection lines, and the second pair of connection lines may be defined by plated and etched aluminum and/or copper. By way of example, the illuminable patch and a pair of electrical contacts may be printed on the second carrier layer, wherein different ones of the pair of electrical contacts are located in overlying contact with different ones of the first and second contact rails.

In some embodiments of the second approach, the first carrier layer with at least the first and second contact rails and the illuminable patch supportably interconnected thereto, and the second carrier layer with at least the first antenna supportably interconnected thereto, are disposed within the opening of the surround member to define additional portions of the inlay. In conjunction therewith, the inlay may further comprise first and second cover layers extending over the entirety of opposing first and second sides of the inlay to facilitate single piece handling of the inlay prior to production of the card. In the later regard, the inlay and the first and second core layers may be laminated together, with additional optional layers, to provide the card.

In some embodiments, the card may be provided as a contactless chip card for contactless interface with a contactless card reader (e.g. for use as a transaction card), wherein the card includes an IC chip module (e.g. an integrated circuit (IC) chip supportably interconnected to an inward-facing side of a substrate) that is located in a pocket extending through the first core layer, wherein the first antenna is electrically interconnected at offset locations thereof to the first and second contact rails by different ones of an electrically-conductive first pair of connection lines to provide the first energy signal to the first and second contact rails, and wherein the first antenna is not electrically connected to the IC chip of the IC chip module. In such embodiments, the card may further include a second antenna, electrically isolated from the metal member, for receiving a contactless signal and providing a second electrical signal to the integrated circuit chip in response thereto. For such purposes, the card may include an electrically-conductive second pair of connection lines electrically interconnected at offset locations of the second antenna for electrical coupling with different ones of a first pair of a plurality of electrical contacts of the integrated circuit chip to provide the second electrical signal thereto (e.g. via direct contact or inductive coupling). In such arrangements, the first electrical signal may be employed for illumination of the illuminable patch, and the second energy signal may be employed for operation of the integrated circuit chip, including transmission of contactless signals from the card to a contactless chip card reader utilizing the second antenna.

In some two antenna implementations, the card may be provided as a dual interface chip card for added contact interface with a contact chip card reader (e.g. for use as a transaction card), wherein the IC chip module further includes a plurality of contact plates, supportably interconnected to an outward-facing side of the substrate, for receiving a contact, third electrical signal (e.g. a DC signal). The plurality of contact plates may be electrically interconnected through the substrate to a corresponding plurality of contacts supportably interconnected to the inward-facing side of the substrate and electrically interconnected to different ones of the plurality of electrical contacts of the IC chip to provide the third electrical signal thereto. The IC chip module may also include a pair of contact pads supportably interconnected to an inward-facing side of the substrate and electrically interconnected to different ones of a pair of the plurality of contacts that are electrically interconnected to different ones of a second pair of the plurality of electrical contacts of the integrated circuit chip, different from the first pair thereof, wherein different ones of the pair of contact pads are electrically interconnected via different ones of a third pair of interconnection lines to different ones of the first and second contact rails to provide the third electrical signal thereto. In such arrangements, the third electrical signal may be employed for both illumination of the illuminable patch and operation of the integrated circuit chip, including transmission of contact signals from the card to a contact chip card reader utilizing the IC chip module.

In conjunction with such two antenna embodiments, one or both of the first pair of connection lines that electrically interconnect the first antenna to different ones of the first and second contact rails may include an in-line capacitor to isolate the first antenna from the second electrical signal (e.g. DC signal of contact signal). Additionally, one or both of the third pair of connection lines that electrically interconnect the pair of contact pads of IC chip module to different ones of the first and second contact rails may include an in-line diode to isolate the IC chip from the first energy signal (e.g. AC signal from contactless signal).

In a first antenna approach, the first antenna may be supportably interconnected to an inward-facing first side of the first carrier layer, in non-overlapping relation to the metal member, and the second antenna may be supportably interconnected to the surround member in non-overlapping relation to the metal member (e.g. the second antenna may comprise wire at least partially embedded in the surround member). The first and second contact rails and the first and second pairs of connection lines may also be supportably interconnected to the first side of the first carrier layer. In turn, each of the third pair of connection lines may include a corresponding first portion supportably interconnected to the first side of the first carrier layer, a corresponding bridge extending through the first carrier layer, and a corresponding second portion supportably interconnected to an outward-facing second side of the first carrier layer with a corresponding metal pad connected thereto and located in contact with a different corresponding one of said pair of contact pads of the IC chip module. In the later regard, the metal pads may be at least partially embedded in the second side of the first carrier layer.

The first antenna, the first and second contact rails, the first pair of connection lines, the second pair of connection lines, and the third pair of connection lines may be defined by metallization, printed electrically-conductive ink, and/or combinations thereof. By way of example, the first antenna, the first and second contact rails, the first pair of connection lines, the second pair of connection lines and the third pair of connection lines may be defined by plated and etched aluminum and/or copper.

In conjunction with the first antenna approach, the illuminable patch may be supportably interconnected to an electrically non-conductive second carrier layer located between the metal member and the first carrier layer on the first side of the metal member, wherein the first and second contact rails and the illuminable patch are disposed in face-to-face relation between the first carrier layer and the second carrier layer. By way of example, the illuminable patch and a pair of electrical contacts may be printed on the second carrier layer, wherein different ones of the pair of electrical contacts are located for separate contact with different ones of the first and second contact rails for passage of an electrical signal.

In a second antenna approach, the illuminable patch and the first and second contact rails may be supportably interconnected to the first carrier layer, and the first antenna and the second antenna may be supportably interconnected to an electrically non-conductive second carrier layer located on the second side of the metal member between the metal member and the second core layer. In turn, the first pair of connection lines may extend around or through the metal member in electrical isolation therefrom.

In conjunction with some embodiments of the second approach, the first and second carrier layers may be defined by corresponding first and second portions of a single, continuous, electrically non-conductive substrate folded around a peripheral edge portion of the metal member. In turn, the illuminable patch, the first and second contact rails, a first portion of the first pair of connection lines, and the second pair of connection lines may be supportably interconnected to a first side of the substrate in the first portion thereof, and the first antenna and a second portion of the first pair of connection lines may be supportably interconnected to the same first side of the substrate in the second portion thereof.

The first antenna, the first and second contact rails, the first pair of connection lines, and the second pair of connection lines may be defined by metallization, printed electrically-conductive ink, and/or combinations thereof. By way of example, the first antenna, the first and second contact rails, the first pair of connection lines, and the second pair of connection lines may be defined by plated and etched aluminum and/or copper. By way of example, the illuminable patch and a pair of electrical contacts may be printed on the second carrier layer, wherein different ones of the pair of electrical contacts are located in overlying contact with different ones of the first and second contact rails.

In some embodiments of the second approach, the second carrier layer with at least the first and second contact rails and the illuminable patch supportably interconnected thereto are disposed within the opening of the surround member, and the first carrier layer with at least the first antenna supportably interconnected thereto are connected to the surround member, to define additional portions of the inlay. In conjunction therewith, the inlay may further comprise first and second cover layers extending over the entirety of opposing first and second sides of the inlay to facilitate single piece handling of the inlay prior to production of the card. In the later regard, the inlay and the first and second core layers may be laminated together, with additional optional layers, to provide the card.

In a first version of the present invention a card may be disclosed. The card may include an electronics layer, the electronics layer defining a first side and a second side opposite the first side, an illuminable patch configured to couple to the first side of the electronics layer at a plurality of locations, wherein the illuminable patch generates light in response to an electrical signal, and a communications element electrically coupled to the card and configured to receive electrical signals wirelessly, wherein the electrical signals received by the communications element provides power to the illuminable patch.

In a first example of the first version, the card may further include a communications element electrically coupled to the electronics layer and configured to receive electrical signals wirelessly, wherein the electrical signals received by the communications element provide power to the illuminable patch.

In a further example of the first example, the card may further include one or more signal filters positioned electrically between the communications element and the illuminable patch, wherein the one or more signal filters are configured to limit forms of current transmitted between the communications element and the illuminable patch.

In another example of the first example, the one or more metal members are positioned to prevent interference with the electrical signals received by the communications element.

In a second example of the first version, the card may further include a power receiving element electrically coupled to the electronics layer and one or more signal filters positioned electrically between the power receiving element and the illuminable patch, wherein the one or more signal filters limit forms of current transmitted between the power receiving element and the illuminable patch.

In a third example of the first version, the card may further include one or more signal filters electrically coupled to the electronics layer, wherein the one or more signal filters are configured to limit the forms of current transmitted to, from, or through the electronics layer.

In a fourth example of the first version, the electronics layer includes a first and second contact rail on the first side, where the first and second contact rail are configured to couple with the illuminable patch and to transmit electrical signals to or from the illuminable patch.

In a first variation of the fourth example, the card may further include a communications element, electrically isolated from the one or more metal members and electrically connected at offset locations to the first and second contact rails, for receiving a contactless signal and providing the electrical signal to the first and second contact rails in response to the contactless signal.

In a second variation of the fourth example, the card may further include a first carrier layer, where the first carrier layer defines the top most layer of the card on the first side of the electronics layer and further defines an opening to a portion of the electronics layer, a second carrier layer, where the second carrier layer is defined as a layer coupled to the metal member layer on a side opposite the electronics layer, an integrated chip module, wherein the integrated chip module is placed within the opening of the first carrier layer and electrically couples to the electronics layer and is further configured to transmit or receive electrical signals from a first external device, where the integrated chip module further includes one or more contact plates, where the contact plates are configured to electrically contact the first external device, and one or more communication elements electrically coupled with the integrated chip module, wherein the one or more communications elements are configured to extend around the perimeter of one or more of the layers and to receive or transmit contactless electrical signals to or from a second external device.

In a first example of the second variation, the card may further include one or more connection lines, wherein the connection lines provide for the transmission of the electrical signal from the contact plates or communication elements to the first and second contact rails to provide power to the illuminable patch, the plurality of connection lines further including one or more signal filters electrically positioned between the contact plates and the illuminable patch and between the communication elements and the illuminable patch, wherein the one or more signal filters limit forms of the electrical signals being transmitted or received by the one or more communication elements, contact plates, or integrated chip module.

In a second example of the second variation, the one or more metal members are in non-overlapping relation with the one or more communication elements and where the first carrier layer, second carrier layer, and electronics layers are coextensive.

In a fifth example of the first version, the card may further include a light transmissive layer, the light transmissive layer coupled to the illuminable patch and having translucent or phosphorescent properties, the light transmissive layer further configured to transmit light to an externally visible location of the card.

In a sixth example of the first version, the card may further include a mask, the mask placed in a vertically spaced relationship with the illuminable patch and in a direction of light emission from the illuminable patch, wherein the mask is configured to permit or block the emission of light from the illuminable patch to generate an externally visible image.

In a first variation of the fourth example of the first version, the card may further include a carrier layer, the carrier layer including a first portion, the first portion configured to couple to the electronics layer on a first side and defining an opening on through a second side to the electronics layer, a second portion, the second portion configured to couple to the metal member layer on a first side of the second portion, an edge, wherein the edge defines the intersection between the first and second portions and is movable to allow the first side of the first portion to couple to the first side of the second portion, and an integrated chip module, wherein the integrated chip module is placed within the opening of the first portion and electrically couples to the electronics layer and is further configured to transmit or receive electrical signals from a first external device, where the integrated chip module further includes one or more contact plates, where the contact plates are configured to contact the first external device, and one or more communication elements electrically coupled with the integrated chip module, wherein the one or more communication elements are configured to extend from the second portion to the electronics layer through the edge and to receive or transmit contactless electrical signals to or from a second external device.

In an example of the first variation of the fourth example, the card may further include one or more connection lines, wherein the connection lines provide for the transmission of the electrical signals from the contact plates or antennas to the first and second contact rails to power the illuminable patch, the plurality of connection lines further including one or more signal filters electrically positioned between the contact plates and the illuminable patch and between the communication elements and the illuminable patch, wherein the one or more signal filters limit unwanted forms of the electrical signals from being transmitted or received by the communication elements, contact plates, or integrated chip module.

In another example of the preceding example, the one or more metal members are in non-overlapping relation with the one or more communication elements and where the first carrier layer, second carrier layer, and electronics layers are coextensive.

In a second version of the present invention, a card may be disclosed. The card may include an electronics layer, the electronics layer defining a first side and a second side opposite the first side, an illuminable patch configured to couple to the first side to the electronics layer at a plurality of locations, wherein the illuminable patch generates light in response to an electrical signal, and a communications element electrically coupled to the card and configured to receive electrical signals wirelessly, wherein the electrical signals received by the communications element provides power to the illuminable patch.

In a first example of the second version, the card may further include one or more signal filters positioned electrically between the communications element and the illuminable patch, wherein the one or more signal filters are configured to limit forms of current transmitted between the communications element and the illuminable patch.

In a first variation of the first example of the second version, the electronics layer includes a first and second contact rail, where the first and second contact rail are configured to couple with the illuminable patch on the first side of the electronics layer and to transmit electrical signals to or from the illuminable patch and where the first and second contact rails are positioned electrically between the one or more signal filers and the illuminable patch.

In a second example of the first version, the card may further include a metal member layer, wherein a portion of the metal member layer includes one or more metal members to provide a stiffness or weight to the card and is configured to couple to the second side of the electronics layer and wherein the one or more metal members are in non-overlapping relation with the communication element.

Numerous additional features and advantages of the present invention will become apparent to those skilled in the art upon consideration of the embodiment descriptions provided herein below.

DETAILED DESCRIPTION

Figure 1:
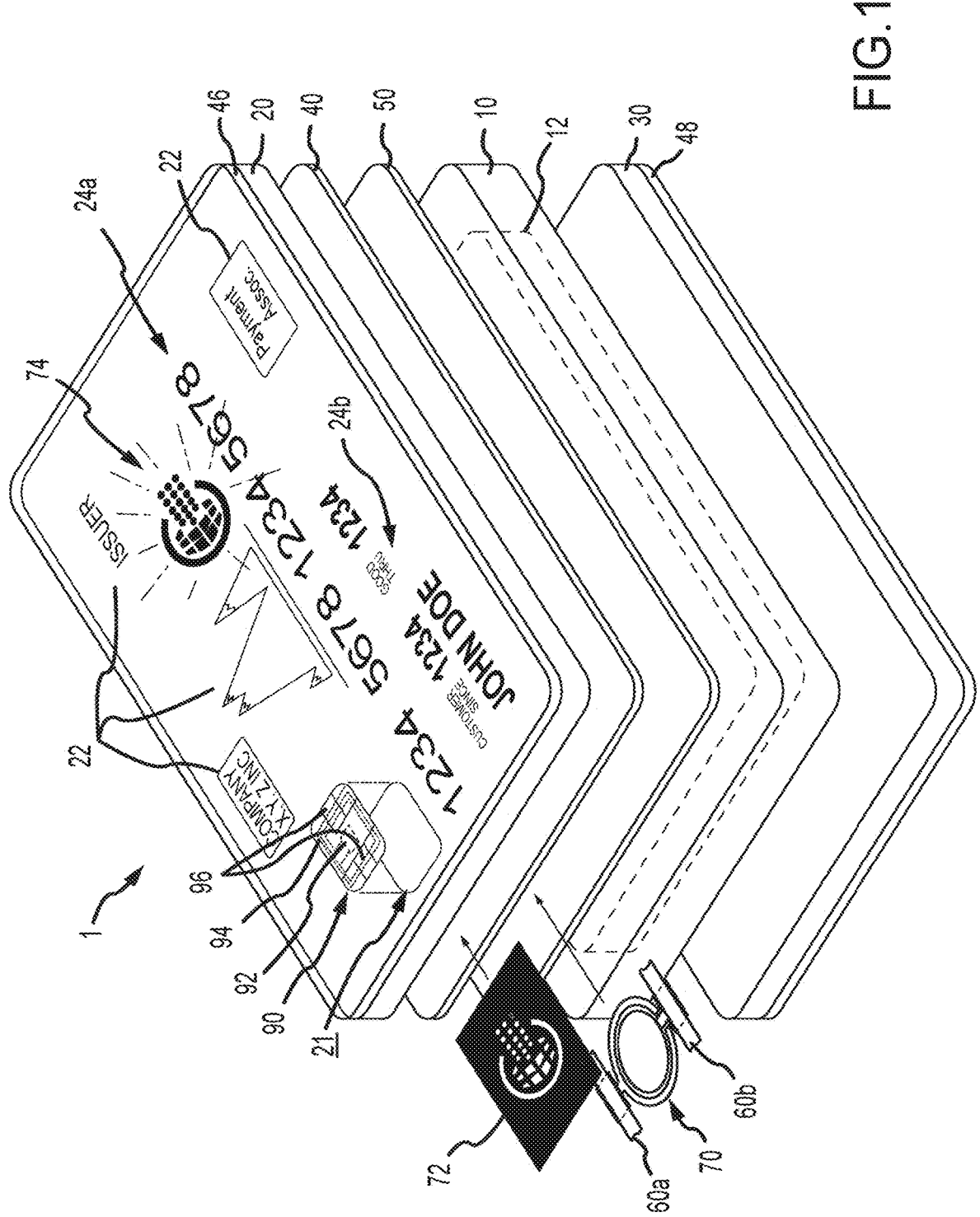
FIG. 1 is a partially exploded perspective view of an embodiment of an illuminable metal card.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

In one example, an illuminable weighted card is disclosed that includes at least one weighted or metal element (e.g., metal weighted member, slug, or frame) that acts to both increase the weight and/or aesthetic appeal of the card (e.g., adding stiffness, weight, and a substantialness to the card). The card may also include a lighting assembly, which may include an illuminable element, such as a light source, or patch, that can be selectively activated via a remote source (e.g., card reader). In one example, the card is configured as a "dual interface" card and can be used with both contact readers, e.g., credit card readers that physically receive or touch the card, and contactless readers, e.g., credit card readers that exchange information with the card wirelessly and do not require a physical contact with the card. In both instances, the card can receive power from the external reader sufficient to activate the illuminable element and illuminate a portion of the card. In some embodiments, the card may include one or more signal filters that may be used to ensure that the different types of power received from different reader types (e.g., contact vs. contactless) do not damage the illuminable element or other feature within the card. In this manner, the card can be used with different types of external readers and still allow illumination, without increasing the thickness of the card, which could prevent satisfying various transaction card or other card standards.

In some embodiments, the card may include a mounting and connectivity assembly that allows the illuminable element to be positioned at different locations on the card body, without having to reconfigure the electronics carrier or connectivity layer. For example, the mounting element may include connectivity rails or pads that are sufficiently long to allow the illuminable element to be positioned at different locations and still connectively coupled to the electronics or connectivity elements within the connectivity layer. Such features allow the manufacturing of the card to be easily modified and updated for different aesthetic designs with the illuminable element at different locations, without requiring new and modified tooling, which can be prohibitively expensive and difficult to change.

In other embodiments, the card may be configured to include a single connectivity, such as to a connectivity element that receives power and/or signals wirelessly from an external card reader. In these instances, the wirelessly transmitted power may be sufficient to activate the illuminable element of the card.

In some embodiments, the card may include a plurality of layers and one or more metal members to add a desired weight or stiffness to the illuminable metal card. The one or more metal members may be placed within the interior of the card or may be visible on the exterior, such as around an exterior edge of the card. The illuminable card may include one or more power elements, such as, but not limited to, a plurality of signal receiving and transmitting features which may be in the form of one or more communication elements, contact pads, or integrated chips that may be configured to convey electrical currents and signals between different features of the illuminable metal card and external devices. Communication elements may include antennas or other features sufficient to wirelessly receive and transmit electrical signals. The illuminable metal card may also include an illuminable patch configured to generate a visible light from the exterior of the card and that may receive power from one or more contact rails that may be configured to allow for the placement of the illuminable patch in one or more of a plurality of locations. Additional features such as a mask may configure the visible light to appear in the shape or form of some image, logo, or other visual feature. The illuminable metal card may further include phosphorescent or translucent layers or properties to further enhance the appearance of the card or to provide additional visual information, such as a glowing patch or glowing edge to the card in response to different signals received by the card or from the generation of light by the illuminable patch.

Turning now to the figures, FIG. 1 is a partially exploded perspective view of an embodiment of an illuminable metal card 1 comprising a weighted member layer, in the form of an inlay 10 or weighted slug, that includes a metal member 12, electrically conductive first and second contact rails 60a, 60b located in spaced relation to one another on a first side of and electrically isolated from the metal member 12, for receiving an electrical signal, and an illuminable patch 70 located on the first side of and electrically isolated from the metal member 12, for electrical coupling with the first and second contact rails 60a, 60b to illuminate upon receipt of an electrical signal at the first and second contact rails 60a, 60b, as will be further addressed below. At least a portion of such illumination may be visible at a first side of the card 1 and/or along one or more peripheral edges of the card 1.

The card 1 may further comprise an electrically non-conductive first core layer 20 located on the first side of the metal member and overlying the first and second contact rails 60*a*, 60*b* and the illuminable patch 70, and an electrically non-conductive a second core layer 30 located on a second side of the metal member 12, opposite to the first side thereof. Printing 22 and 32 may be provided on the first core layer 20 and second core layer 30, respectively, as will be further addressed. In the illustrated embodiment, the first and second contact rails 60*a*, 60*b* and the illuminable patch 70 may be supportably interconnected to and located in face-to-face relation between a first carrier layer 40 (e.g. an electrically non-conductive and light transmissive layer) and a second carrier layer 50 (e.g. an electrically non-conductive and optionally, light transmissive layer), respectively, located on the first side of the metal member 12, between the first core layer 20 and the metal member 12.

The card 1 may also include a mask 72 overlying at least a portion of the illuminable patch 70 and defining a predetermined image 74 on the first side of the card 1 upon illumination of the illuminable patch 70. The mask 72 permits passage of and blocks passage of different portions of the illumination to provide the predetermined image 74. By way of example, the predetermined visible image may correspond with a name, logo, character, graphics or other visual representation associated with or otherwise selected by a given entity. Optionally, the mask may be defined as part of the printing 22 on first core layer 20. In applications where the total thickness of the card 1 must fit within a predetermined range, such as to comply with ISO/IEC Standard 7810 or other customer requirements, a printed mask may be preferable to minimize the thickness of the mask 72, which may allow for additional features to be placed in the card than in a card with a thicker mask 72. In cards that may have a wider range of thicknesses, the mask 72 may alternatively be formed through etching, molding, engraving or similar processes to provide a predetermined image 74. In the illustrated embodiment, protective first and second outer layers 46, 48 may be provided in overlying relation to first and second core layers, 20, 30, respectively.

Figure 3A:
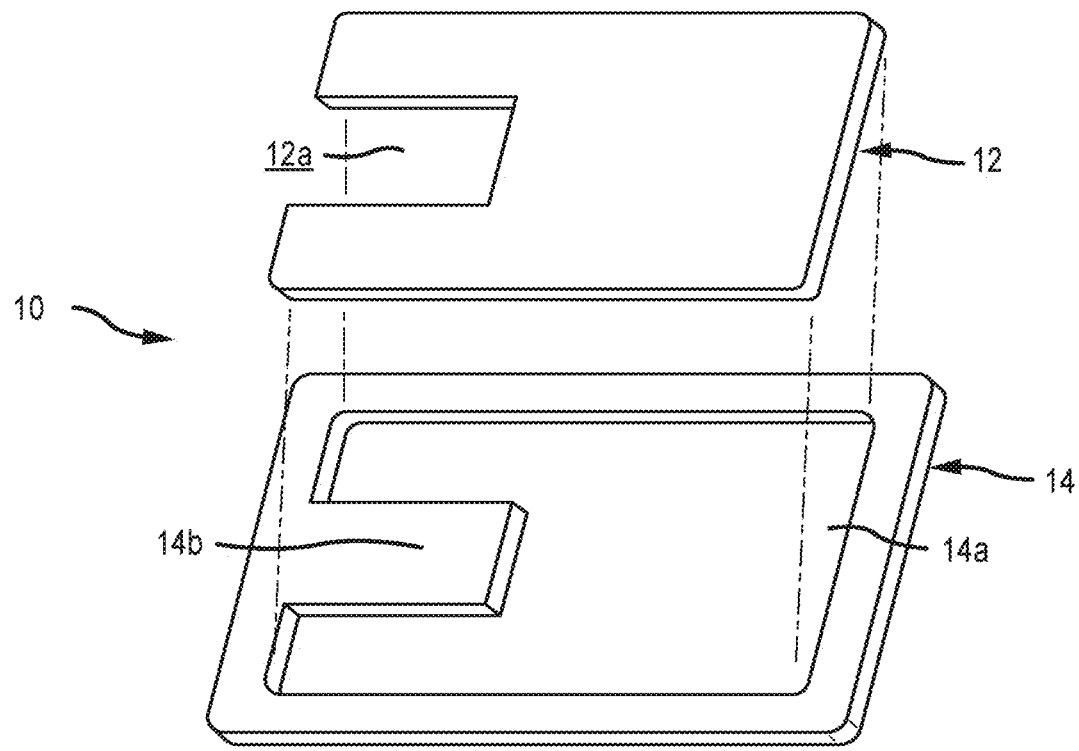
FIG. 3A is an exploded perspective view of an embodiment of an inlay of the card embodiment shown in FIG. 1, the inlay comprising a metal member and surround member.
Figure 3B:
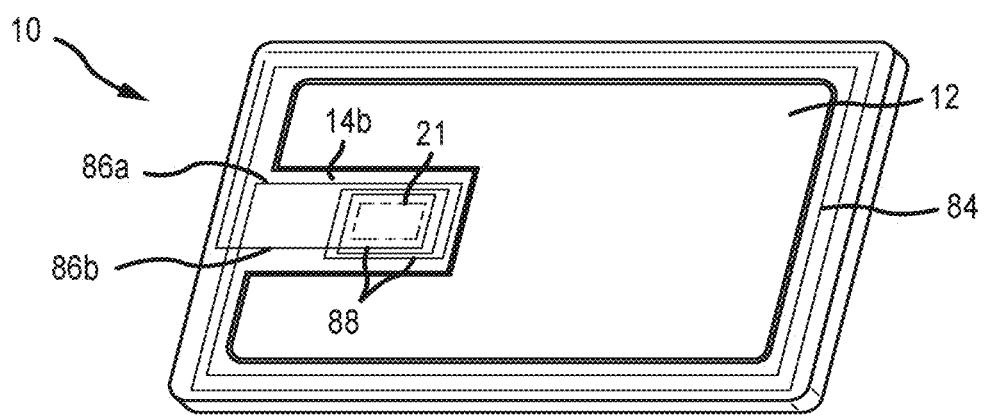
FIG. 3B is a perspective view of the inlay embodiment shown in FIG. 3A, further comprising a contactless signal antenna supported by the surround member and provided for inductive electrical coupling with an integrated circuit chip module.
Figure 3C:
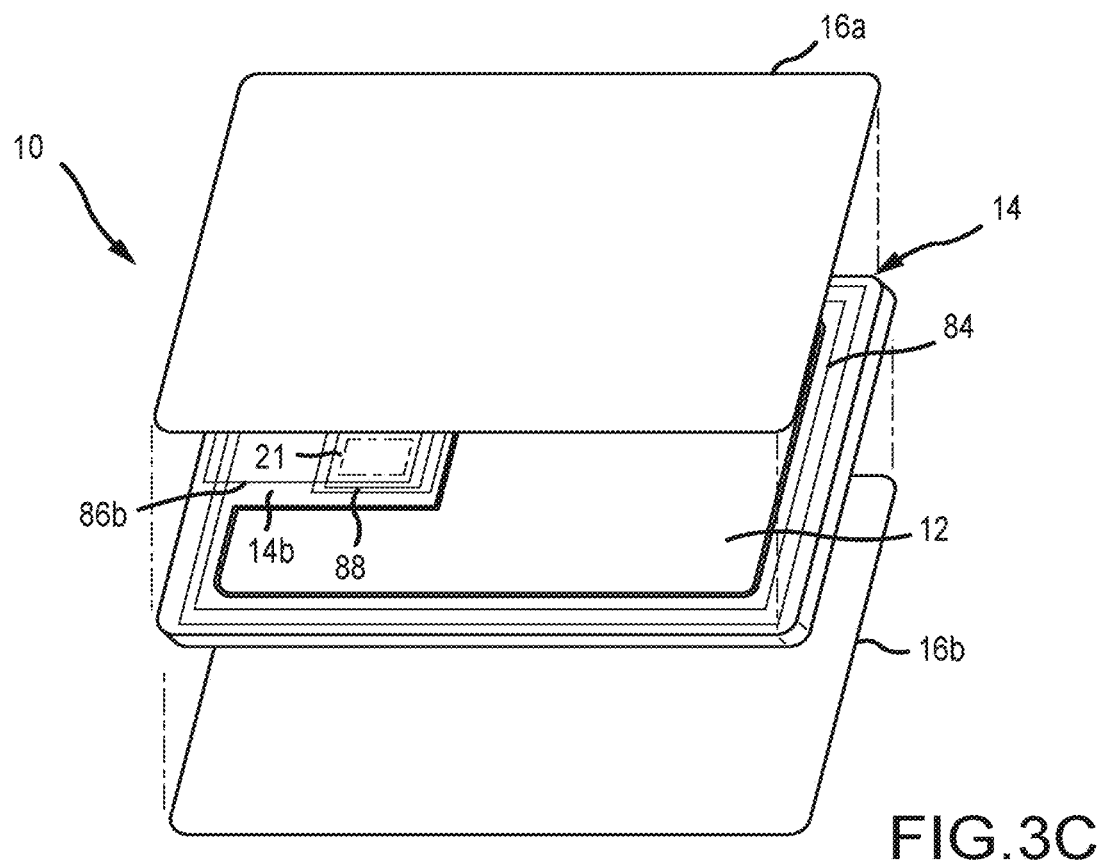
FIG. 3C is a partially exploded perspective view of the inlay embodiment shown in FIG. 3C, further comprising cover layers provided on opposing sides of the inlay embodiment.

Reference is now made to FIGS. 3A, 3B and 3C, which illustrate an embodiment of a weighted member layer or "pre-lam" in the form of an inlay 10. The weighted member layer may be defined as a metal member layer or a similar layer sufficient to add a stiffness or weight to a card and may include other layers, as well, such as a stack up of layers that are set for over-lamination layers including graphical elements and/or personalization elements. As shown, the inlay 10 may comprise a surround member 14 having an opening 14*a* that receives the metal member 12 therein. The opening 14*a* and metal member 12 may have corresponding configurations in length and width dimensions. For example, the metal member 12 may abut the surround member 14 within the opening 14*a* thereof, thereby facilitating press-fit placement. Further, in the illustrated embodiment, the surround member 14*g* 14*a* and metal member 12 may be of a common thickness. As shown in FIG. 3C cover layers 16*a*, 16*b* may be supportably interconnected to opposing sides of the surround member 14 and inlaid metal member 12, as part of the inlay 10. The inlay 10, surround member 14, and the metal member 12 may further be configured such that the metal member 12 may be visible from an exterior of the card 1. In such examples the surround member 14 and opening 14*a* may be configured to allow for the placement of the metal member 12 at a location at or near an exterior edge of the card 1. In further examples, the inlay 10 may be configured to receive a plurality of metal members sufficient to add either an increased weight, stiffness, or to provide a metallic appearance or texture to the card 1. In examples where the metal member 12 extends near signal receiving and transmitting components of the card 1, such as the first antenna 80 described below, a ferrite material may be added to the metal member 12, as a coating or through another application, to limit interference with signals. In other examples, the weighted member layer may include a variety of configurations sufficient to allow for features such as metal members 12 to couple directly to an adjacent layer. In some examples, one or metal members may be shaped so as to not interfere with communication elements, such as antennas, and coated with an adhesive to directly adhere to adjacent layers, such as the first carrier layer 40 or the second carrier layer 30. In other examples, adjacent layers, such as the first carrier layer 40 or the second carrier layer 30, may be shaped to receive and retain the weighted member layer, or components of the weighted member layer such as a metal member 12.

A number of approaches may be utilized to provide an electrical signal to a contact element, such as first and second contact rails 60*a*, 60*b* to illuminate the illuminable patch 70, including the use of contactless and/or contact signals (e.g. as utilized contact and/or contactless card readers). In that regard, reference is now made to FIG. 4A which illustrates a plan view of an inward-facing side (e.g. downward-facing) of the first carrier layer 40. Electrical signals sufficient to convey data or power may be received and transmitted to the illuminable patch through one or more power receiving elements. The power receiving elements may include metal contact pads 68*a*, 68*b*, an integrated chip module 90, or communications elements which may include antennas such as the first antenna 80. As shown, a first antenna 80 (e.g. at least one or a plurality of electrically-conductive metal loops) and the first and second contact rails 60*a*, 60*b* may be supportably interconnected to the inward-facing side of the first carrier layer 40. In turn, the first antenna 80 may be electrically interconnected at offset locations to different ones of an electrically-conductive first pair of connection lines 62*a*, 62*b* that are electrically interconnected to different ones of the first and second contact rails 60*a*, 60*b*, wherein the first antenna 80 may receive a contactless signal (e.g. a radiofrequency signal) and provide a first electrical signal to the first and second contact rails 60*a*,60*b* in response thereto (e.g. an alternating current (AC) signal) to illuminate the illuminable patch 70 (shown in phantom lines). Contactless signals may be electrical signals in the form of alternating current, or AC, which is defined as an electrical current that regularly reverses direction.

Figure 4A:
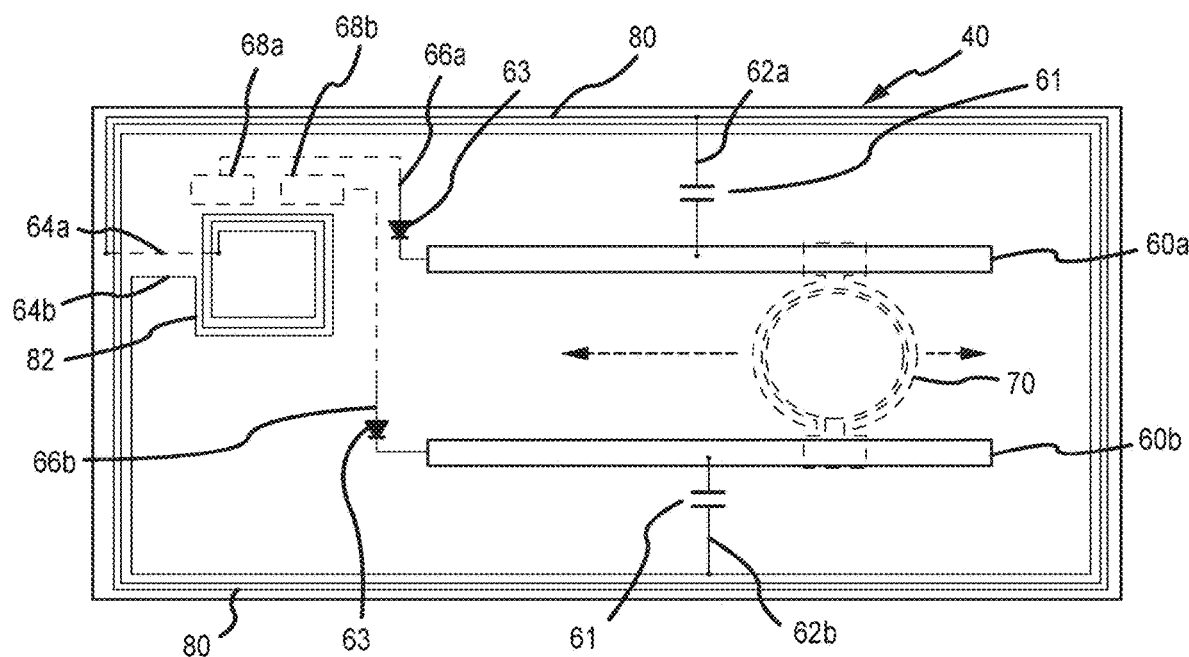
FIG. 4A is a bottom plan view of an embodiment of a first carrier layer of the card embodiment shown in FIG. 1.
Figure 4B:
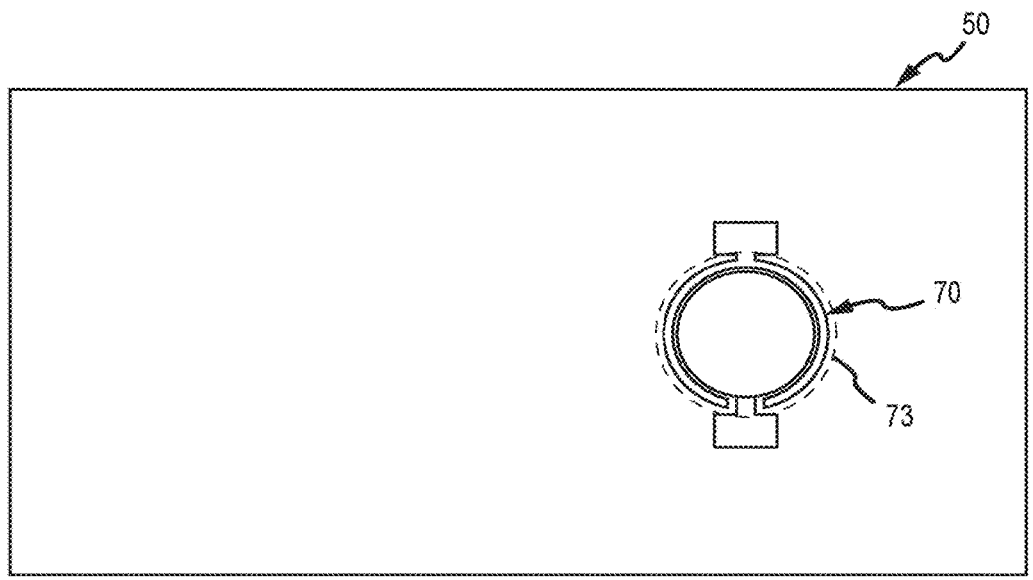
FIG. 4B is a top plan view of a second carrier layer of the card embodiment shown in FIG. 1.

In the later regard, reference is now made to FIG. 4B which illustrates a plan view of an outward-facing side (e.g. upward-facing) of the second carrier layer 50, with illuminable patch 70 supportably interconnected thereto so that the illuminable patch 70 and first and second contact rails 60*a*, 60*b* are disposed for electrical coupling. The first and second contact rails 60*a*, 60*b* may be configured so as the illuminable patch 70 to be positioned in a plurality of locations along the length of the contact rails 60*a*, 60*b*. In the example shown in FIG. 4A, the illuminable patch 70 may be placed in any of a plurality of along the lengths of the first and second contact rails 60*a* 60*b*. In other words, the illuminable patch 70 or element can be connectively coupled to the contact rails 60*a*, 60*b* at substantially any location along the length of the contact rails 60*a*, 60*b*.

By utilizing a card with first and second contact rails that provide a plurality of placement positions for the illuminable patch 70, the manufacturing time and cost for any given card may be reduced and a variety of designs for different customers may be more readily manufactured. Specifically, often each layer for a card may require a unique mold, printing, or similar process and it may be costly to prepare multiple configurations of certain layers, such as the first carrier layer 40, for a variety of orders. In other words, for different card designs, such as different aesthetic and graphic layers that require the illuminable patch 70 to be located along different areas of the card, e.g., different horizontal and/or vertical locations relative to the card surface, the extended rail length and connectivity allows the varied placement of the illuminable patch 70 without reconfiguring the electrical connections between the contact points (e.g., rails) and the electronic components. Such a configuration also allows for the layers other than the illuminable patch 70 layer to be prepared in a similar manner for a variety of designs. Further, by providing a variety of mounting features, the tolerances for placement of the illuminable patch 70 may be comparatively forgiving compared to a single discrete positioning of the illuminable patch 70 reducing the cost and precision required to manufacture the card 1.

In this manner, the illuminable patch 70 can be arranged in a plurality of positions allowing a variety of designs to be achieved by changing the configuration of a reduced number of layers, such as only the placement of the illuminable patch 70, for different customer design requests. The first and second contact rails 60*a*, 60*b* may be in a substantially parallel relationship to the other contact rail as well as substantially parallel to an edge of the card 1 as shown in FIG. 4A. In other examples, the contact rails 60*a*, 60*b* may remain in substantially parallel conformity to the other rail but forming a variety of paths or patterns relative to and edge of the card 1, such as in an arcing shape. Additionally, the first and second contact rails 60*a*, 60*b* may each define a positive or negative contact rail such that the first contact rail 60*a* may correspond to a positive contact rail and the second contact rail 60*b* may correspond to a negative contact rail.

In other examples, the first and second contact rails 60*a*, 60*b* may be replaced with a variety of signal transmission features or contact elements. The signal transmission features may be configured to transmit electrical signals to and from the illuminable patch 70 in a substantially similar way, but may be physically configured differently. The signal transmission features may define one or more mounting points for the illuminable patch 70 in one or more locations relative to the card 1, such as near multiple corners of the card 1 or other discrete locations. The mounting points may be defined as pairs of connection points with minimal tolerances requiring precise placement of the illuminable patch 70 or larger features sufficient to allow an illuminable patch 70 to be positioned in a variety of orientations for any given mounting point. In these examples multiple layers of the card 1 may still be utilized for a variety of designs while the amount of electrically conductive material may be reduced compared to a card 1 utilizing a first and second contact rail 60*a*, 60*b*.

In some embodiments, the illuminable patch 70 may comprise a substantially clear, electrically-conductive layer supportably disposed on the second carrier layer 50 for electrical coupling with the first contact rail 60*a* (e.g. direct or capacitive coupling), an intermediate layer comprising a plurality of illuminable diodes supportably disposed on the electrically-conductive layer, and an electrically-conductive pad supportably disposed on the intermediate layer for electrical coupling with the second contact rail 60*b* (e.g. direct or capacitive coupling). As such, the illuminable patch 70 may define a circuit from the first contact rail 60*a* through the electrically-conductive layer through the intermediate layer through the electrically-conductive pad and through the second contact rail 60*b*. The intermediate layer may include a plurality of small diodes arranged in a combination of positions and, or sublayers to define the intermediate layer such that when current is transmitted through the layer the plurality of diodes generate light. The illuminable patch 70 may be configured to generate light at a range of voltages and amperages. For example, the illuminable patch may be configured to generate light at 3V and 80-100 milliamps. In other examples, the light patch may generate light at 3, 6, 9, and 12V and at a corresponding amperage and power. In some examples, the patch may generate more light in one direction of current as compared to an opposite direction of current.

The electrically-conductive pad may be electrically isolated from the electrically-conductive layer or electronics carrier by a layer of electrically non-conductive material disposed there between. The electrically conductive layer and the electrically conductive pad may be configured to couple to the first and second contact rails 60*a*, 60*b* at a plurality of locations on the rails and may further be configured to couple to a variety of paths of and spaced relations between the first and second contact rails 60*a*, 60*b*, as described above. This may allow the placement of the illuminable patch 70 to be changed for a variety of customer designs to minimize cost and parts necessary for a variety of designs. In assembling a card 1, each component may be placed on a prefabricated layer that requires specific tooling and other set up. By utilizing first and second contact rails 60*a*, 60*b* the illuminable patch 70 can be coupled at one or more locations, which may prevent the need for changes to other layers of the card 1 for any given design, such as maintaining the same first carrier layer 50 for a variety of placements of the illuminable patch 70 for a variety of different designs. The generation of light from the illuminable patch 70 may correspond to an associated interaction with an external device, such as an emission of lights during the processing of a transaction or activating a locking mechanism. The generation of light may provide useful feedback from a user where other visual indicators are not available or obscured, such as blocking a card reader screen during contactless payment.

The first and second core layers 20, 30, first and second outer layers 46, 48, surround 12, first and second cover layers 16*a*, 16*b* may comprise polymer-based materials (e.g. polyvinyl chloride, polyethylene terephthalate, polyethylene terephthalate glycol-modified, polyester, and/or polycarbonate). Further, the first carrier layer 40 and second carrier layer 50 may comprise a polymer-based material (e.g. polyethylene terephthalate and/or polycarbonate). Additionally, the various polymer-based material layers described herein may be interconnected via lamination, with thermo-adhesive polymer-based layers or thermosetting, polymer-based layers disposed between adjacent one of the layers.

Returning to FIGS. 1, 2A and 2B, card 1 may be provided in a variety of forms, including a collector card, an identity card, an access card, a loyalty card, a membership card, a transit card, or a transaction card (e.g. a credit card, debit card, stored value card, reward card or card employable for payment). In that regard, card 1 may be provided with additional features for facilitating such usages.

In particular, card 1 may define a card configuration having at a length L, a width W and a thickness in compliance with ISO/IEC Standard 7810 (e.g. an ID-1 card). In that regard, the inlay 10, first core layer 20, second core layer 30, and first and second carrier layers 40, 50 may each be of a common length and width, thereby accommodating lamination of such layers in an interconnected assembly.

Card 1 may further comprise power receiving elements configured to receive electrical signals and power from an external device such as an integrated circuit (IC) chip module 90 located in a pocket 21 on the first side of the card that that extends through the first core layer 20. The IC chip module 90 may include an integrated circuit (IC) chip 92 (shown in phantom lines), supportably interconnected to an inward-facing side of a substrate, wherein the IC chip may employ the first energy signal provided by the first antenna 80 to power the IC chip 92 for contactless signal interface with a contactless card reader via the first antenna 70, in compliance with ISO/IEC Standard 14443. In that regard, the IC chip 92 may be encoded during a personalization process with data corresponding with an account or record uniquely associated with the card 1 (e.g. a payment account administered by or on behalf of a card issuer payment institution, a membership account administered by a card issuer merchant institution, an identity verification record, etc.).

In that regard, and with further reference to FIG. 4A, different ones of an electrically-conductive second pair of connection lines 64a, 64b may be electrically interconnected at second offset locations of first antenna 80 for electrical coupling with different ones of a first pair of electrical contacts of the IC chip of IC chip module 90 to provide the first electrical signal thereto (e.g. via direct contact or inductive coupling). For example, in the arrangement shown in FIG. 4A, the second pair of electrical connection lines 64a, 64b are electrically interconnected to offset locations of a coupling antenna 82 supportably interconnected to the first carrier layer. In turn, the IC chip module 90 may include a module antenna 94 (shown in phantom lines in FIGS. 1, 6, and 7) supportably interconnected to the inward-facing side of the substrate of the IC chip module 90, in overlapping relation to coupling antenna 82, wherein the module antenna and coupling antenna 82 are provided for inductive coupling so as to provide the first energy signal from the first antenna 80 to the IC chip of the IC chip module 90. As noted, such arrangement may be utilized for contactless data transmission signals between the IC chip 92 and a contactless card reader via first antenna 80, in compliance with ISO/IEC Standard 14443.

Returning again to FIGS. 1 and 2A, IC chip module 90 may include a plurality of contact plates 96, supportably interconnected to an outward-facing side of the substrate, for receiving a contact, second energy signal (e.g. a direct current or DC signal) to power the IC chip 92 for contact signal interface with a contact card reader via the plurality of contact plates 96, in compliance with ISO/IEC Standard 7816. Contact electrical signals may be in the form of a direct current signal, or DC, which may be defined as an electrical current that flows in only one direction. In some arrangements, the card 1 may be provided so that the contact second energy signal is also provided to the first and second contact rails 60a, 60b for illumination of illuminable patch 70. By providing multiple features sufficient to provide power and electrical signals to the illuminable patch 70, a single card 1 may be utilized for in a variety of uses with an external device, such as with both a contact or contactless credit card reader.

Figure 6:
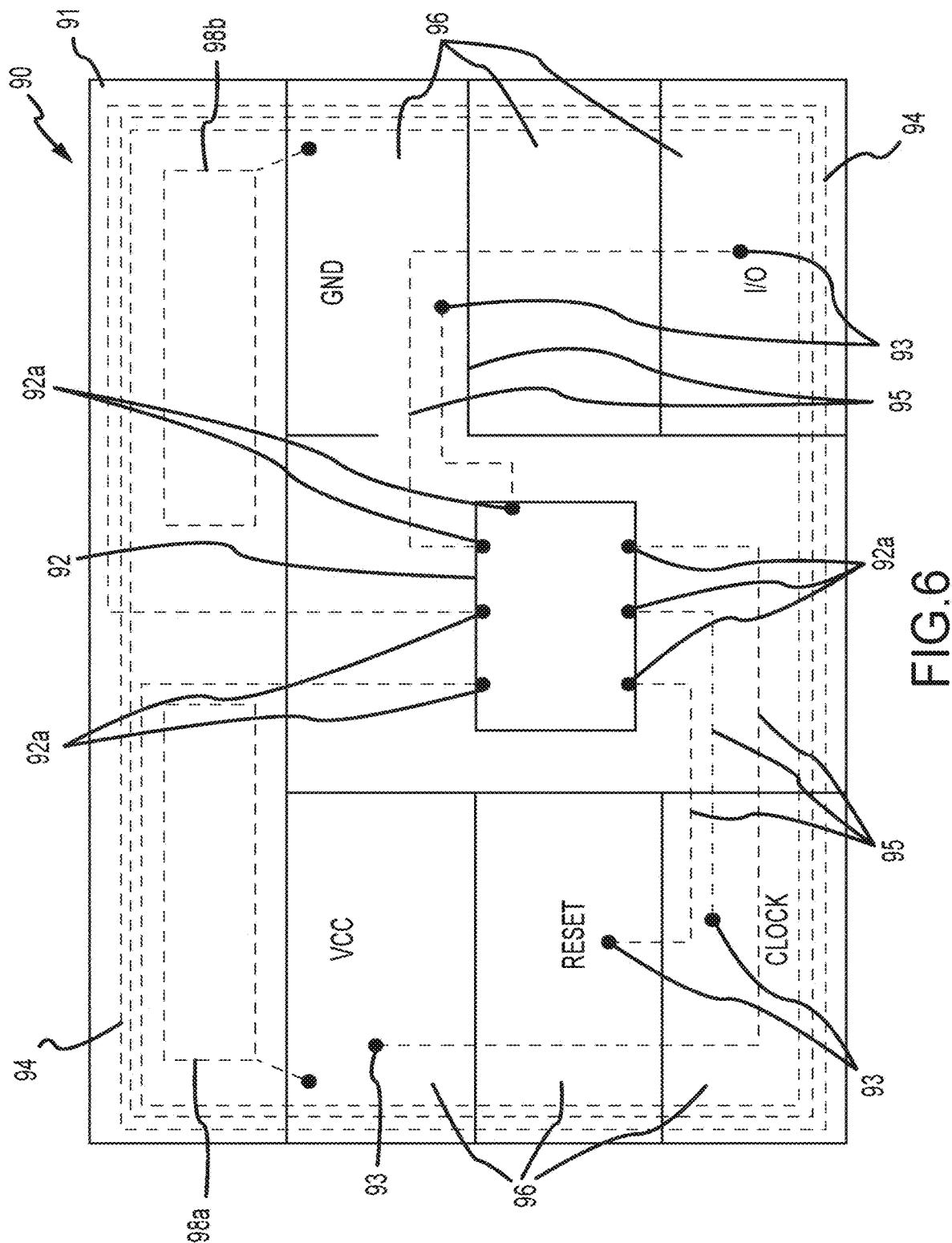
FIG. 6 is a top plan view of an embodiment of an integrated circuit chip module of the card embodiment shown in FIG. 1.

In that regard, reference is now made to FIG. 6 which illustrates a top plan view of an embodiment of power receiving element in the form of an IC chip module 90, with the plurality of contact plates 96 electrically interconnected through electrically non-conductive support substrate 91 to a corresponding plurality of contacts 93 (shown in phantom), supportably interconnected to an inward-facing side of the substrate 91. In turn, the plurality of contacts 93 (e.g. contacts 93 corresponding with contact plates VCC, GND, I/O, Reset and Clock) may be electrically interconnected via electrically conductive lines 95 (e.g. wire lines or trace lines on substrate 93) to different ones of a first subset of the plurality of electrical contacts 92a of the IC chip 92 to provide the second electrical signal thereto. Further, different ones of a first pair of the plurality of electrical contacts 92a of the IC chip 92 that are not included in the first subset may be electrically interconnected to offset locations of the module antenna 94 for inductive coupling with coupling antenna 82, as noted above.

The IC chip module 90 may also include a pair of contact pads 98a, 98b supportably interconnected to the inward-facing side of the substrate 93 and electrically interconnected to different ones of a pair of the plurality of contacts 93 (e.g. contacts for contact plates VCC and GND) that are electrically interconnected to different ones of a second pair of the plurality of electrical contacts 92a of the IC chip 92, different from the first pair thereof referenced above. In turn, and with reference to both FIG. 6 and FIG. 4A, different ones of the pair of contact pads 98a, 98b may be electrically interconnected via different ones of a third pair of interconnection lines 66a, 66b to different ones of the first and second contact rails 60a, 60b to provide the second electrical signal thereto. Each of the third pair of connection lines 66a, 66b may include a corresponding first portion supportably interconnected to the first side of the first carrier layer 40, a corresponding bridge extending through the first carrier layer, and a corresponding second portion supportably interconnected to an outward-facing second side of the first carrier layer 40 with a corresponding metal pad 68a, 68b connected thereto and located in contact with a different corresponding one of said pair of contact pads 98a, 98b of the IC chip module 90. In the later regard, the metal pads 68a, 68b may be at least partially embedded. In the embodiment shown in FIG. 6, the contact pads 98a, 98b are disposed in non-overlapping relation to and laterally between contact pads 96 and module antenna 94 along an edge of IC chip module 90 corresponding with a length dimension of card 1. In another embodiment, the contact pads 98a, 98b may be disposed in non-overlapping relation to and laterally between contact pads 96 and module antenna 94 along another edge of IC chip module 90 corresponding with a width dimension of card 1.

The first antenna 80, the first and second contact rails 60a, 60b, the first pair of connection lines 62a, 62b, the second pair of connection lines 64a, 64b, and the third pair of connection lines 66a may be defined by metallization, printed electrically-conductive ink, and/or combinations thereof. By way of example, the first antenna 80, the first and second contact rails 60a, 60b, the first pair of connection lines 62a, 62b, the second pair of connection lines 64a, 64b, and the third pair of connection lines 66a may be defined by plated and etched aluminum and/or copper.

As shown in FIG. 4A, either or both of the first pair of connection lines 62a, 62b that electrically interconnect the first antenna 80 to different ones of the first and second contact rails may include an in-line capacitor 61 to isolate the first antenna 80 from the second electrical signal (e.g. DC signal of contact signal). As further shown, either or both of the third pair of connection lines 66a, 66b that electrically interconnect the pair of contact pads 98a, 98b of the IC chip module 90 to different ones of the first and second contact rails 60a, 60b may include an in-line diode 63 to isolate the IC chip 92 from the first energy signal (e.g. AC signal from contactless signal).

In various examples, electrical signals may be transmitted to the first and second contact rails 60a, 60b from both or either of contactless application with an external device or from contact applications with an external device (e.g., card reader). In many instances, contactless external devices utilize AC signals and contact applications commonly utilize DC signals, the card 1 may include one or more signal filters 61, 63 between the first and second contact rails 60a, 60b and the contactless circuit assembly, which may include communication elements such as the first antenna 80, and contact applications, such as the IC chip module 90. The filters 61, 63 may include one or more in-line capacitors 61 or in-line diodes 63 as shown in FIG. 4A, or other similar components to limit the transmission of different electrical signal forms to certain components, such as a DC signal to the first antenna 80 or an AC signal to the IC chip module 90.

The filters 61, 63 function so as to allow for only electrical signals or waveforms of either an AC form or DC form to pass through a circuit. For example, the in-line diodes 63 function to allow for the DC electrical signals to transmit over a contact circuit which may include the IC chip module 90, first and second contact rails 60a, 60b, and the illuminable patch 70 while preventing the transmission of AC electrical signals to the IC chip module 90. In contrast, the capacitors 61 function to allow for AC electrical signals to transmit over a contactless circuit which may include the first antenna 80, the first and second contact rails 60a, 60b and the illuminable patch 70 while preventing the transmission of DC electrical signals to the first antenna 80. By including filters 61, 63 the card 1 may be utilized for both contactless and contact applications and prevent damage to both the card 1 and an external device and the illuminable patch 70 may generate light during both contact and contactless applications. Further, the filters 61, 63 may eliminate the need for additional layers, connections, or circuitry to prevent the intersection of AC and DC signals which may allow for substantially increased functionality for cards of a specified thickness.

In a modified embodiment of card 1, the first antenna 80 may be provided without inclusion of the second pair of connection lines 64a, 64b shown in FIG. 4A. Optionally, and as shown in FIGS. 3B and 3C, a second antenna 84 may be supportably interconnected to the surround member 14, wherein the second antenna 84 may be provided for receiving a contactless signal and providing an additional electrical signal to the IC chip 92 in response thereto. For such purposes, the card may include an electrically-conductive additional pair of connection lines 86a, 86b electrically interconnected at offset locations of the second antenna 84 for electrical coupling with different ones of the above-referenced first pair of the plurality of electrical contacts 92a of the IC chip 92 to provide the additional electrical signal thereto (e.g. via direct contact or inductive coupling), wherein the IC chip 92 may employ the additional energy signal provided by the second antenna 84 to power the IC chip 92 for contactless signal interface with a contactless card reader via the second antenna 84, in compliance with ISO/IEC Standard 14443.

For example, in the arrangement shown in FIGS. 3B and 3C, the additional pair of electrical connection lines 86a, 86b may be electrically interconnected to offset locations of a coupling antenna 88 supportably interconnected to the support member 14, wherein coupling antenna 88 and the module antenna 94 are provided for inductive coupling so as to provide the additional energy signal from the second antenna 84 to the IC chip 92 of the IC chip module 90. As noted, such arrangement may be utilized for contactless data transmission signals between the IC chip 92 and a contactless card reader via second antenna 84, in compliance with ISO/IEC Standard 14443. The second antenna 84, additional pair of connections lines 86a, 86b, and coupling antenna 88 may be defined by metallic wire supportably disposed on and partially embedded in the surround member.

Figure 3D:
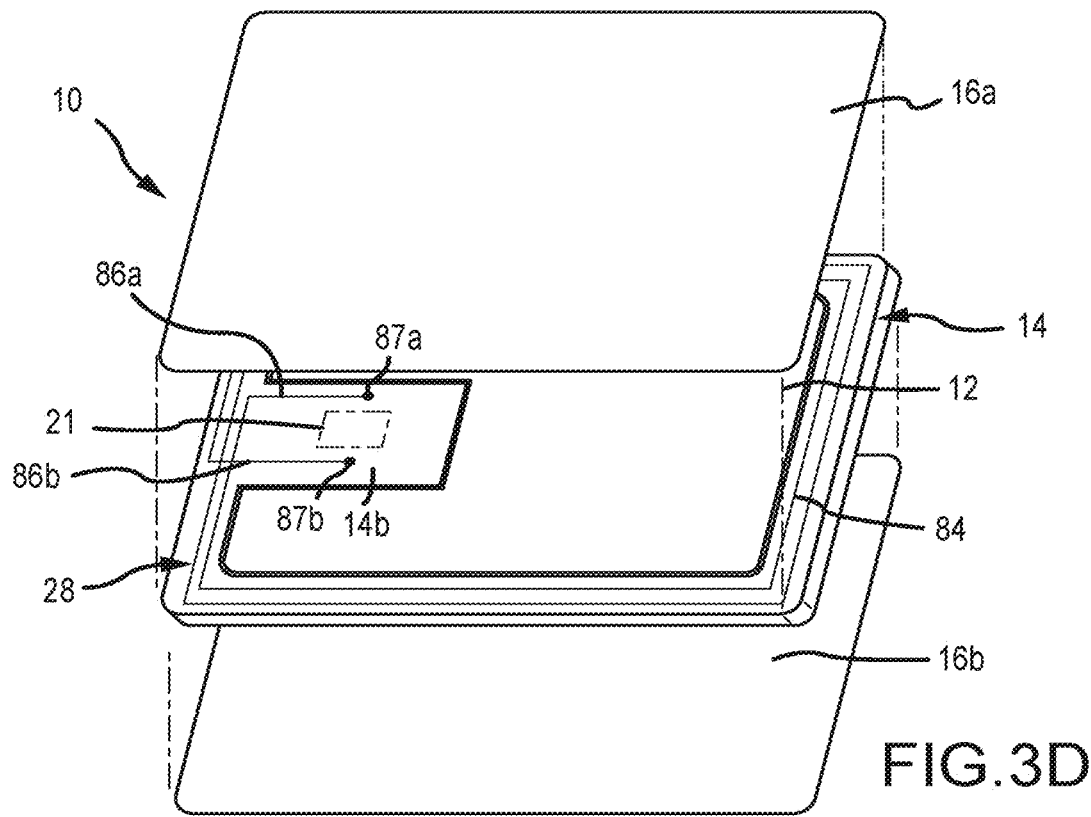
FIG. 3D is a partially exploded perspective view of another embodiment of an inlay for inclusion in the card embodiment shown in FIG. 1, the inlay comprising a metal member, a surround member, a contactless signal antenna supported by the surround member and provided for direct electrical coupling with an integrated circuit chip module, and cover layers provided on opposing sides of the inlay embodiment.
Figure 5:
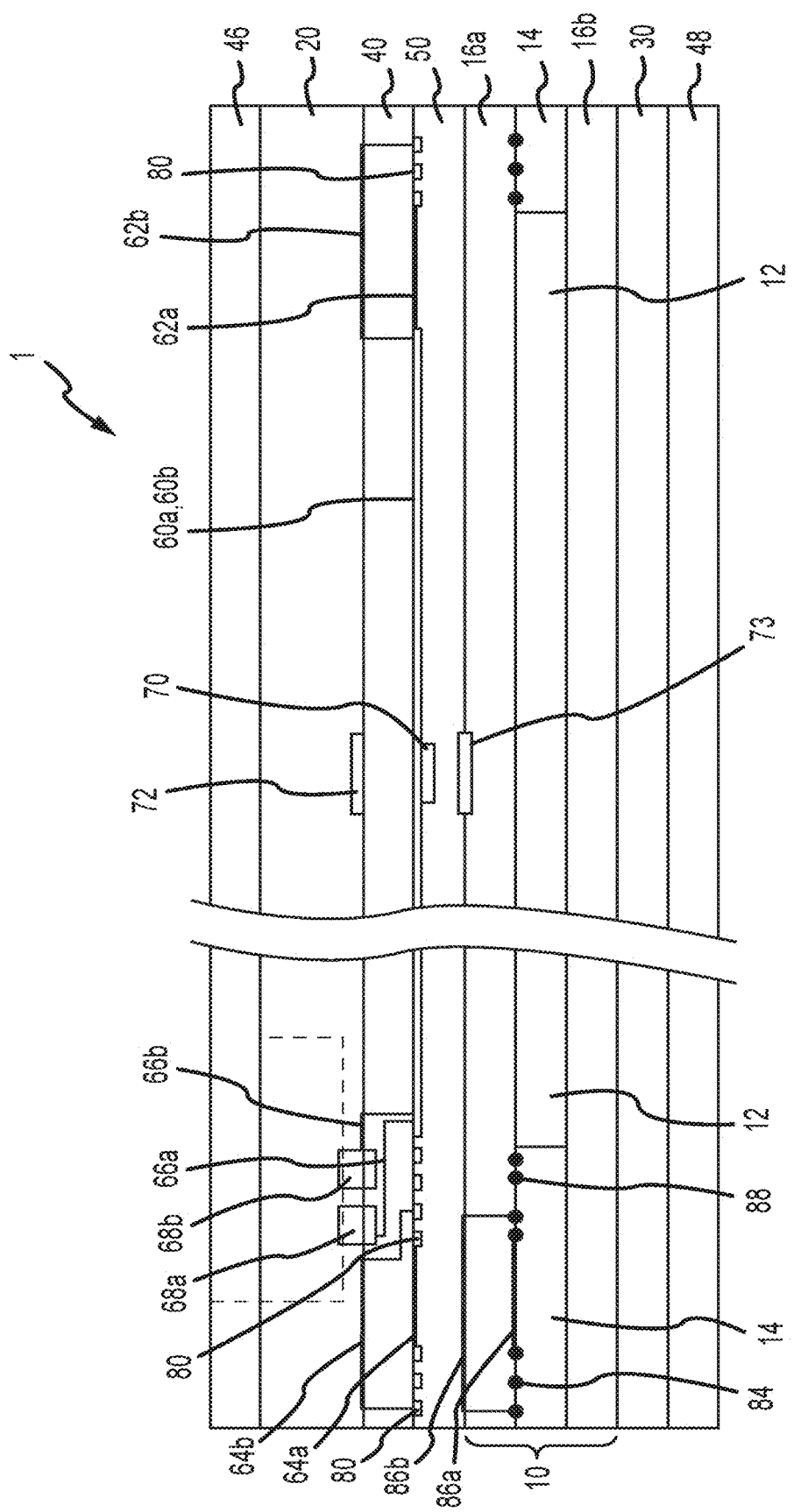
FIG. 5 is a schematic cross-sectional view of the card embodiment shown in FIG. 1.

In another approach, and with reference to FIG. 3D, the additional pair of electrical connection lines 86a, 86b may be electrically interconnected to corresponding contact pads 87a, 87b for direct electrical coupling with corresponding electrical contacts supportably interconnected to the inward-facing side of the substrate of IC chip module 90 and electrically connected to different ones of the above-referenced first pair of the plurality of electrical contacts 92a of the IC chip 92 to provide the additional electrical signal thereto. Reference is now made to FIG. 5 which illustrates a schematic cross-sectional view of the card embodiment shown in FIG. 1, including the pair of connection lines 64a, 64b and coupling antenna 82 in a first approach for providing an electrical signal to IC chip 92, or alternatively, including the second antenna 84, the pair of connection lines 86a, 86b and the coupling antenna 88 in a second approach for providing an electrical signal to IC chip 92, as described above in relation to FIG. 4A and FIGS. 3B, 3C, respectively.

As further shown in FIG. 5, an optional phosphorescent patch 73 may be provided in overlapping relation to the illuminable patch 70 so as to fluoresce upon illumination of the illuminable patch 70. The phosphorescent patch 73 may have substantially the same configuration as the configuration of the illuminable patch 70. In one approach, the phosphorescent patch 73 may be supportably interconnected to the second carrier layer 50 on the same side as the illuminable patch 70 (e.g. in underlying relation to the illuminable patch 70 in direct contact with the second carrier layer 50). In the approach illustrated in FIG. 5, the phosphorescent patch 73 may be supportably interconnected to the opposing side of the second carrier layer 50 (e.g. in direct contact therewith).

In some embodiments, the card 1 may comprise a translucent layer that is located in overlapping relation to the illuminable patch 70, and that includes at least a portion that extends to a peripheral edge of the card 1. In turn, a portion of light emitted by the illuminable patch 70 may be internally reflected within the translucent layer and directed to the peripheral edge of the card 1 to illuminate such peripheral edge, thereby providing a distinctive feature to the card 1. In one approach, the translucent layer may comprise a sheet-like layer that extends to and about the entirety of the peripheral edge of the card 1. For example, when a rectangular illuminable card is provided, each of the length edges and width edges may be illuminated by the translucent layer upon illumination of the illuminable patch 70. Optionally, the translucent layer may comprise a fluorescent pigment, or dye. In the embodiment shown in FIG. 5, the second carrier layer 50 may be translucent to provide the translucent layer.

In some examples, the card 1 may include a light transmissive layer, which may include or be a variation of the translucent layer and, or phosphorescent patch, that exhibits one or both translucent and phosphorescent properties such that light generated by the illuminable patch 70 may both be internally reflected to an externally visible location on the card 1, such as to a peripheral edge of the card 1 or a second mask 74 and, or fluoresce in response to the generation of light by the illuminable patch 70. The light transmissive layer may be utilized to provide additional feedback to a user in response to an action on an external device or may be utilized to provide a higher quality aesthetic or means of differentiating a variety of cards. In one example, the layer may be formed by utilizing a PET material that includes a phosphorescent powder or material to provide a layer with both translucent and phosphorescent properties. Certain colors may appear to give off a brighter appearance, such as yellows or oranges, but other colors may be utilized as well. The light transmissive layer may be placed at a location in close proximity to or in physical contact with the illuminable patch 70. The light transmissive layer may be coextensive with the first and second carrier layers or the light transmissive layer may be defined by a shorter length or width.

In one implementation the various layers may be provided to have the following approximate thicknesses:

First outer layer 46: 0.002 in.;
First core layer 20 with first printing 22: 0.004 in. to 0.008 in.;
First carrier layer 40 with first and second contact rails 60, 60b and first antenna 80: 0.001 in.;
Second carrier layer 50 with illuminable patch 70 and phosphorescent patch 73: 0.002 in. to 0.010 in.;
Inlay 10: 0.008 in. to 0.020 in.;
    First cover layer 16a: 0.002 in.;
    Metal member 12 and surround member 14 with optional second antenna 84: 0.004 in. to 0.008 in.;
    Second cover layer 16b: 0.002 in;
Second core layer 48 with second printing: 0.004 in. to 0.008 in.; and,
Second out layer 48: 0.002 in.

The approximate total thickness of card may be within a range of about 0.030 in. to 0.033 in., with a weight within a range of about 8 gm. to 20 gm. In other examples the card may be of a different thickness or weight depending on the intended use or purpose of the card.

Figure 2A:
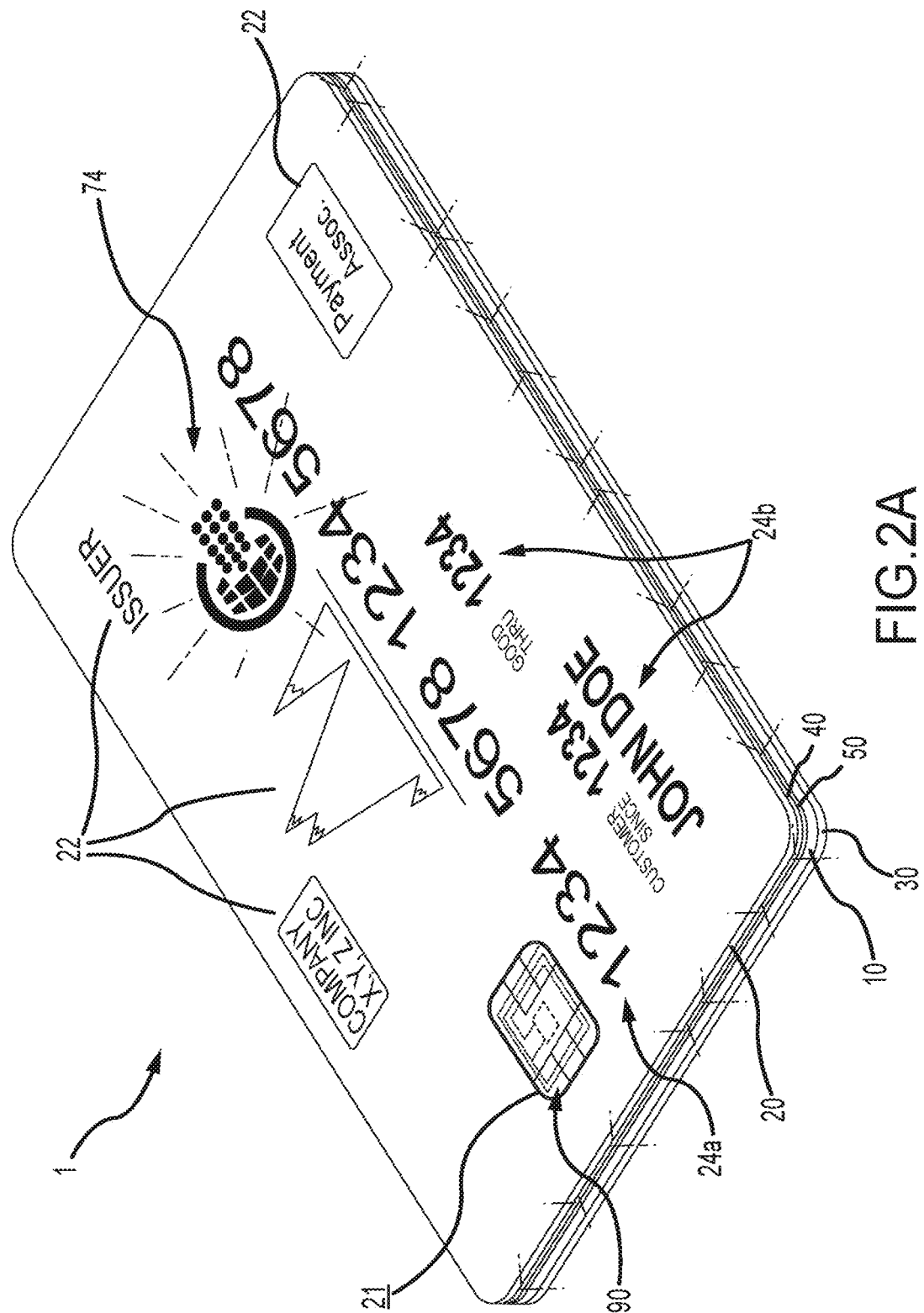
FIG. 2A is a perspective front view of the card embodiment shown in FIG. 1.
Figure 2B:
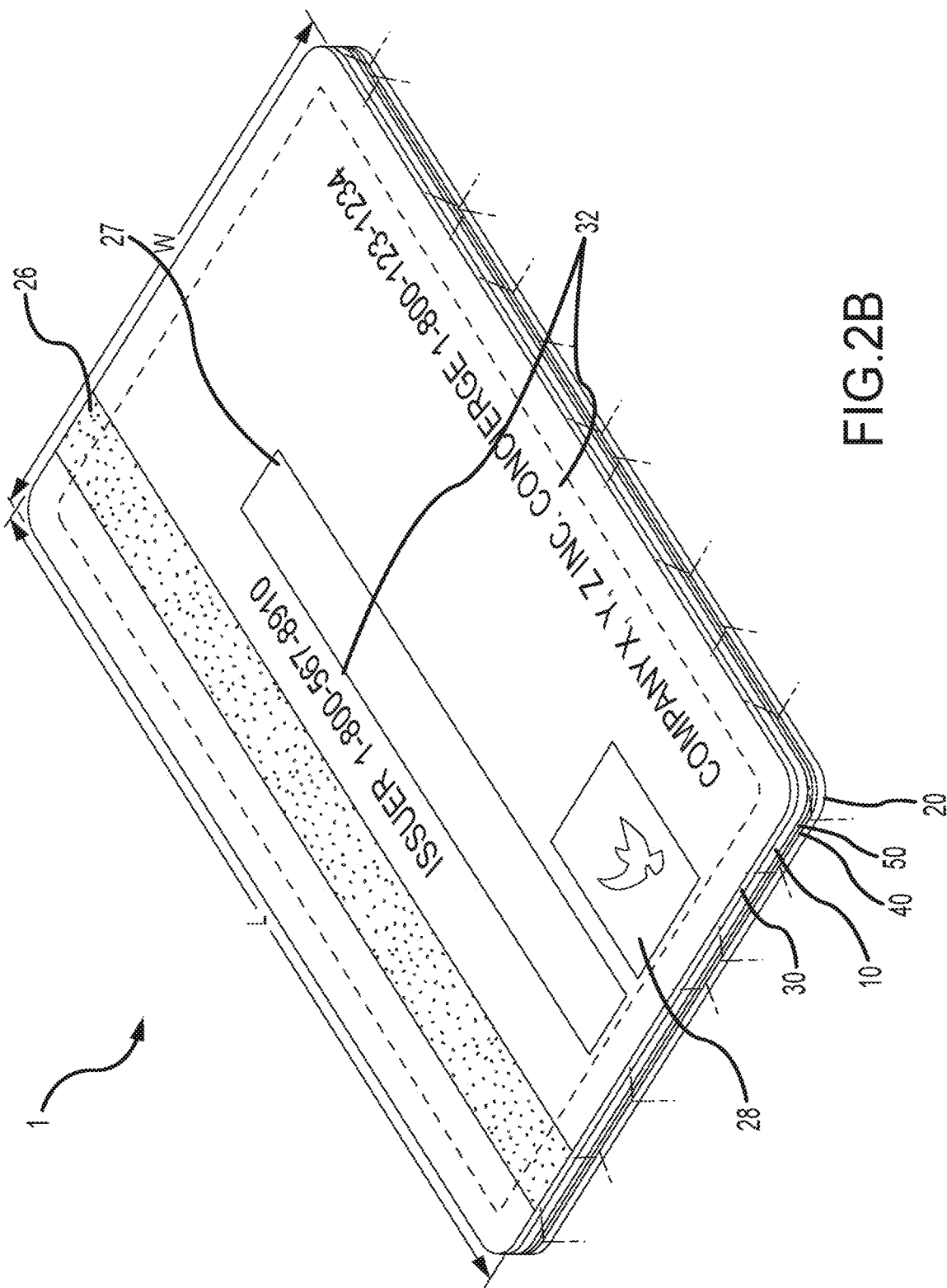
FIG. 2B is a perspective rear view of the card embodiment shown in FIG. 1.

Further reference is now made to FIGS. 1, 2A and 2B which illustrate optional printing 22 visible from a first side of the card 1 and optional printing 32 visible from a second side of the illuminable card 1, respectively. Printing 22 and/or 32 may comprise one or more predetermined print regions that include corresponding graphics (e.g. a pictorial scene, a logo, a photo, etc.), corresponding human-readable characters (e.g. numbers, letters, and/or representations thereof) and/or one or more corresponding machine-readable markings (e.g. a bar code, a multi-dimensional matrix code). Printing 22 may be provided to define a portion or all of the mask 72 as discussed above. Printing may be preferable over other forms of generating visual information in some examples to minimize the amount the graphics contribute to the overall thickness of the card 1.

Printing 22 may be forward printed on an outward-facing side of the transparent first core layer 20 (e.g. regardless of whether the first core layer 20 is transparent, translucent or opaque), or reverse printed on an inward-facing side of the transparent first core layer 10. Similarly, printing 32 may be forward printed on an outward-facing side of the second core layer 30 (e.g. regardless of whether the second core layer 30 is transparent, translucent or opaque), or reverse printed on an inward-facing side of the second core layer 30 if the second core layer 30 is transparent.

As shown in FIG. 2A, illuminable card 1 may also include personalization data 24a, 24b comprising visible indicia indicative of or otherwise corresponding with an account or record uniquely associated with the card 1 (e.g. a payment account administered by or on behalf of a card issuer payment institution, a membership account administered by card issuer merchant institution, etc.). In some embodiments, visible personalization indicia 24a and/or 24b may be provided by embossing the card body of the card 1 to define the indicia. In other embodiments, visible personalization indicia 24a and/or 24b may be defined by printing on one or both of the first core layer 20 and/or second core layer 30. In still other embodiments, visible personalization indicia 24a and/or 24b may be defined at an outward-facing surface of the card 1 (e.g. by at least one of laser engraving, ink jet printing and thermoprinting).

The visible personalization indicia 24a may comprise human-readable characters indicative of a corresponding account (e.g. account number). Further, visible personalization indicia 24b may include additional human-readable data corresponding with a given account, including a corresponding card expiration date, a corresponding account service grade level, and/or corresponding customer-specific data (e.g. customer name, customer duration, data, etc.). In the card 1 embodiment of FIGS. 2A and 2B, visible indicia 24a, 24b are provided for viewing from a first side of the card 1. In other embodiments, visible indicia 24a and/or 24b may be also or alternately provided for viewing from the second side of the card 1. As may be appreciated, the visible indicia 24a, 24b may be provided as personalization data on illuminable card 1 as a part of card personalization processing.

As shown in FIG. 2B, card 1 may also include a magnetic stripe 26 affixed to the second side of the card 1. The magnetic stripe 26 may be encoded during card personalization with personalization data unique to the card 1 (e.g. data corresponding with the account indicated by visible indicia 24a). The magnetic stripe 26 may be provided in compliance with ISO/IEC Standard 7811. As further shown, a signature block 27 and/or hologram 28 may also be affixed to the second side of the card 1 (e.g. via hot-stamping).

Figure 7:
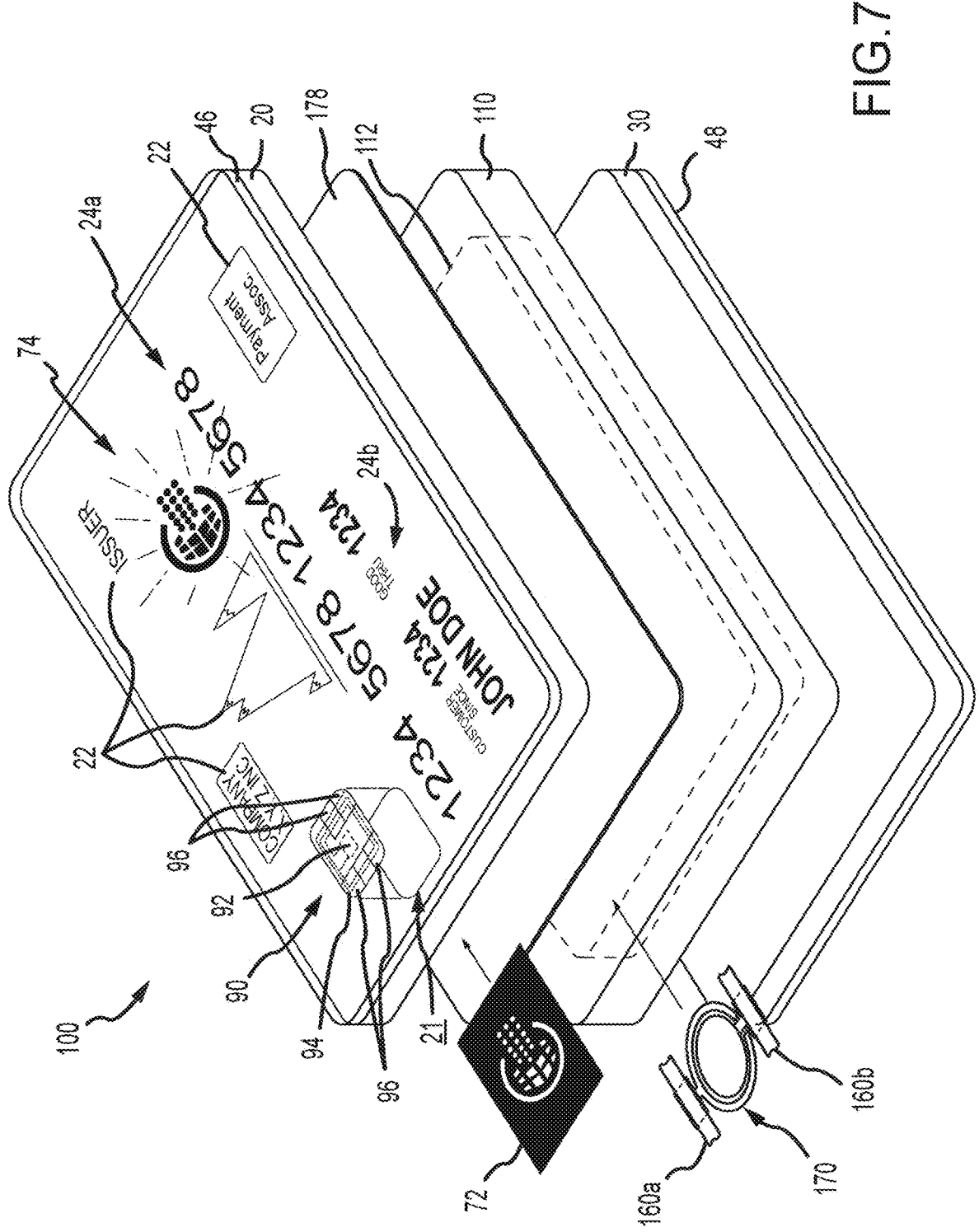
FIG. 7 is a partially exploded perspective view of another embodiment of an illuminable metal card.

FIG. 7 is a partially exploded perspective view of another embodiment of an illuminable metal card 100 comprising an inlay 110, wherein the inlay 110 includes a metal member 112, electrically conductive first and second contact rails 160a, 160b located in spaced relation to one another on a first side of and electrically isolated from the metal member 112, for receiving an electrical signal, and an illuminable patch 170 located on the first side of and electrically isolated from the metal member 112, for electrical coupling with the first and second contact rails 160a, 160b to illuminate upon receipt of an electrical signal at the first and second contact rails 160a, 160b, as will be further addressed below. At least a portion of such illumination may be visible at a first side of the card 100 and/or along one or more peripheral edges of the card 100.

The card 100 may further comprise an electrically non-conductive first core layer 20 (e.g. a light transmissive layer) located on the first side of the metal member 112 in overlying relation to the inlay 110 and first and second contact rails 160a, 160b and illuminable patch 170 included therein, and an electrically non-conductive a second core layer 30 located on a second side of the metal member 122, opposite to the first side thereof. Printing 22 and 32 may be provided on the first core layer 20 and second core layer, respectively, as will be further addressed. The card 1 may also include a mask 72 overlying at least a portion of the illuminable patch 170 and defining a predetermined image 74 on the first side of the card 100 upon illumination of the illuminable patch 170. The mask 72 permits passage of and blocks passage of different portions of the illumination to provide the predetermined image 74. By way of example, the predetermined visible image 74 may correspond with a name, logo, character, graphics or other visual representation associated with or otherwise selected by a given entity. Optionally, the mask may be defined as part of the printing 22 on first core layer 20. In the illustrated embodiment, protective first and second outer layers 46, 48 may be provided in overlying relation to first and second core layers, 20, 30, respectively. Optionally, a translucent layer 178 may be disposed between the inlay 110 and the first core layer 20 for illuminating the peripheral edge of the card 100, as described above.

Figure 8:
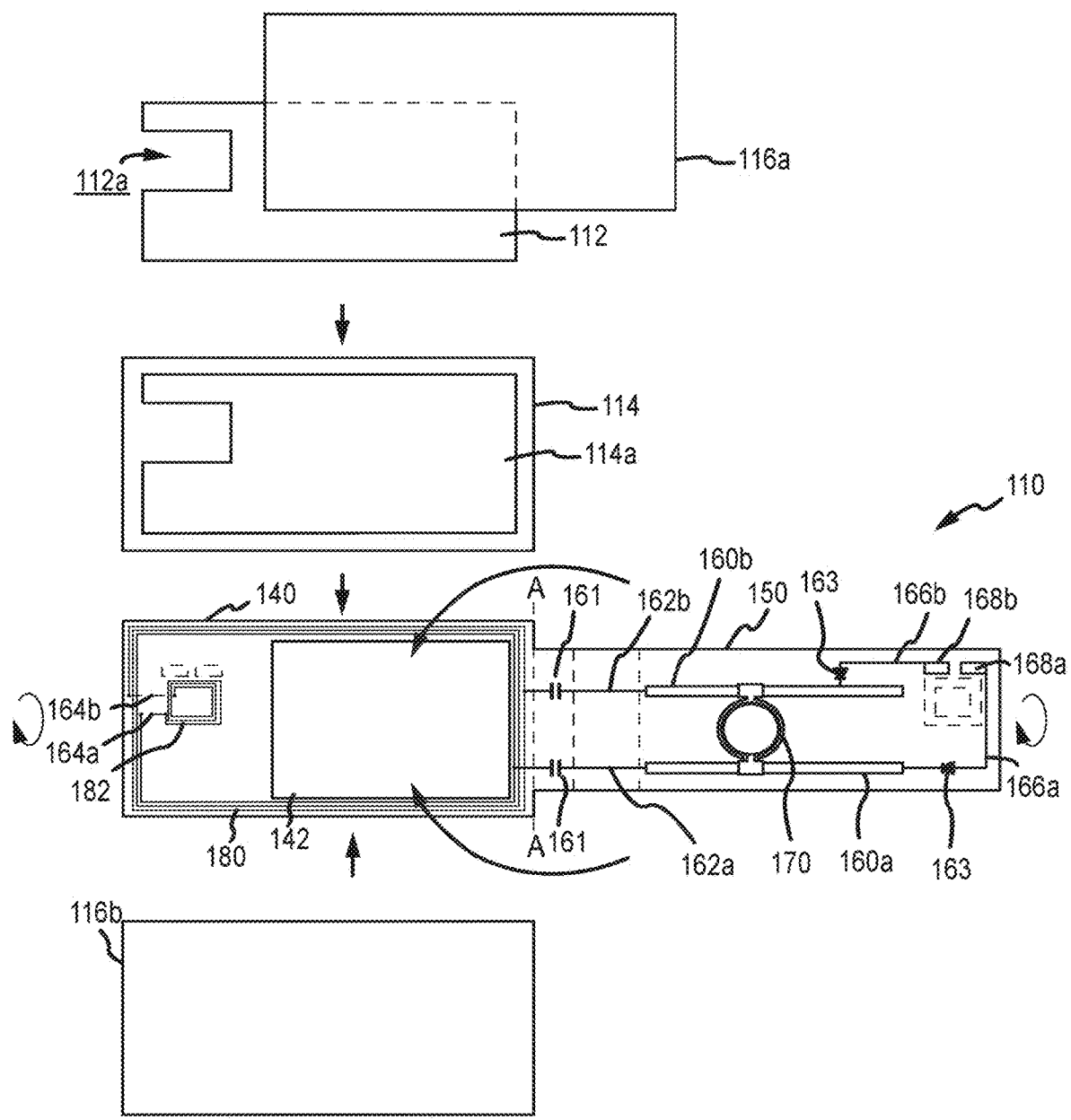
FIG. 8 is a top plan view of components of an embodiment of an inlay of the card embodiment shown in FIG. 7.

A number of approaches may be utilized to provide an electrical signal to the first and second contact rails 160a, 160b to illuminate the illuminable patch 170, including the use of contactless and/or contact signals (e.g. as utilized contact and/or contactless card readers). In that regard, reference is now made to FIGS. 8 and 9 which illustrate an embodiment of the inlay 110 of the assembled card 100 shown in FIG. 7, respectively. As shown in FIG. 8, the illuminable patch 170 and the first and second contact rails 160a, 160b may be supportably interconnected to a first carrier layer 140 for location on the first side of metal member 112 between the metal member 112 and the first core layer 20, and a first antenna 180 (e.g. at least one or a plurality of electrically-conductive metal loops) may be supportably interconnected to an electrically non-conductive second carrier layer 150 for location on the second side of the metal member 112 between the metal member 112 and the second core layer 30, wherein the first antenna 180 is disposed in non-overlapping relation to the metal member 180. In turn, the first antenna 180 may be electrically interconnected at offset locations to different ones of an electrically-conductive first pair of connection lines 162a, 162b that are electrically interconnected to different ones of the first and second contact rails 160a, 160b, wherein the first antenna 180 may receive a contactless signal (e.g. a radiofrequency signal) and provide a first electrical signal to the first and second contact rails 160a, 160b in response thereto (e.g. an AC signal) to illuminate the illuminable patch 170, wherein the first pair of connection lines 162a, 162b may extend around or through the metal member 112 in electrical isolation therefrom.

In the illustrated approach, the first and second carrier layers 140, 150 may be defined by corresponding first and second portions of a single, continuous, electrically non-conductive substrate, wherein the metal member 112 may be positioned within an opening 114a of a surround member 114, and wherein the metal member 112 does not overlap first antenna 180. In assembly, the substrate may be back folded then flexed and forwarded folded so that the second portion of the substrate corresponding with second carrier layer 150 is advanced into and through an opening 142 in the second portion of the substrate corresponding with the first carrier layer 140. In turn, the folded substrate may be flipped, or inverted, so that the first antenna 180 on the first carrier layer 140 is facing downward and the second carrier layer 150 with the interconnected first and second rails 160a, 160 and illuminable patch 170 supportably interconnected thereto is projecting upward from the first carrier layer 140. Then, a downward-facing side of the surround member 114 may be positioned over and secured to the upward-facing side of the first carrier layer 140 with the projecting second carrier 150 extending through the opening 114a of the surround member 114. A cover layer 116b layer may be secured to the downward-facing side of the first carrier layer. Then, the metal member 112 may be located in the opening 114a of the surround member 114, on the upward-facing side of the first carrier layer. Next, the projecting second carrier layer 150 may be forward folded around a peripheral edge portion of the metal member 112 so that the first carrier layer 150 is positioned over the metal member 112, wherein the first pair of connection lines 162a, 162b extend around the peripheral edge portion of the metal member 112 to the upward-facing first and second contact rails 160a, 160b and illuminable patch 170 on the second carrier layer 150. In such approach, the illuminable patch 170, the first and second contact rails 162a, 162b, and a first portion of the first pair of connection lines 162a, 162b may be supportably interconnected to a first side of the substrate in the first portion thereof, and the first antenna 180 and a second portion of the first pair of connection lines 162a, 162b may be supportably interconnected to the same first side of the substrate in the second portion thereof, thereby facilitating production efficiencies. By utilizing a single, continuous substrate to define the first and second carrier layers 140, 150 the electrical components may be positioned in such a manner that electrical signals may be received or transmitted from either side of the card 100. Further, such a configuration may reduce the number of openings, apertures, or connection points necessary to facilitate transmission of the electrical signals between the electrical components, such as through the metal member 112 or between the carrier layers 140, 150. The configuration may also function to reduce interference from the metal member 112 on the transmission or reception of electrical signals from, to, or within the card 100.

The first and second core layers 20, 30, first and second outer layers 46, 48, surround 112, first and second cover layers 116a, 116b may comprise polymer-based materials (e.g. polyvinyl chloride, polyethylene terephthalate, polyethylene terephthalate glycol-modified, polyester, and/or polycarbonate). Further, the substrate of first carrier layer 140 and second carrier layer 150 may comprise a polymer-based material (e.g. polyethylene terephthalate and/or polycarbonate). Additionally, the various polymer-based material layers described herein may be interconnected via lamination, with thermo-adhesive polymer-based layers or thermosetting, polymer-based layers disposed between adjacent one of the layers.

Returning to FIG. 7, card 100 may be provided in a variety of forms, including a collector card, an identity card, an access card, a loyalty card, a membership card, a transit card, or a transaction card (e.g. a credit card, debit card, stored value card, reward card or card employable for payment). In that regard, card 100 may be provided with additional features for facilitating such usages.

In particular, card 100 may define a card configuration having at a length L, a width W and a thickness in compliance with ISO/IEC Standard 7810 (e.g. an ID-1 card). In that regard, the inlay 110, first core layer 20, and second core layer 30 may each be of a common length and width, thereby accommodating lamination of such layers in an interconnected assembly. Further, card 100 may include additional features provided on first core layer 20 and second core layer 30, as described above in relation to the embodiment of card 1 shown in FIGS. 2A and 2B.

Further in that regard, card 100 may further comprise an integrated circuit (IC) chip module 90 located in a pocket 21 on the first side of the card 100 that that extends through the first core layer 20. The IC chip module 90 may include an integrated circuit (IC) chip 92 (shown in phantom lines), supportably interconnected to an inward-facing side of a substrate, wherein the IC chip may employ the first energy signal provided by the first antenna 180 to power the IC chip 92 for contactless signal interface with a contactless card reader via the first antenna 170, in compliance with ISO/IEC Standard 14443. In that regard, the IC chip 92 may be encoded during a personalization process with data corresponding with an account or record uniquely associated with the card 100 (e.g. a payment account administered by or on behalf of a card issuer payment institution, a membership account administered by a card issuer merchant institution, an identity verification record, etc.).

In that regard, and with further reference to FIG. 8, different ones of an electrically-conductive second pair of connection lines 164a, 164b may be supportably interconnected to second carrier layer 150 and electrically interconnected at second offset locations of first antenna 180 for electrical coupling with different ones of a first pair of electrical contacts of the IC chip of IC chip module 90 to provide the first electrical signal thereto (e.g. via direct contact or inductive coupling). For example, in the arrangement shown in FIG. 8, the second pair of electrical connection lines 64a, 64b are electrically interconnected to offset locations of a coupling antenna 182 supportably interconnected to the second carrier layer 150. In turn, the IC chip module 90 may include a module antenna 94 (shown in phantom lines in FIG. 7) supportably interconnected to the inward-facing side of the substrate of the IC chip module 90, in overlapping relation to coupling antenna 182, wherein the module antenna 94 and coupling antenna 182 are provided for inductive coupling so as to provide the first energy signal from the first antenna 180 to the IC chip of the IC chip module 90. As noted, such arrangement may be utilized for contactless data transmission signals between the IC chip 92 and a contactless card reader via first antenna 180, in compliance with ISO/IEC Standard 14443.

Returning again to FIG. 7, IC chip module 90 may include a plurality of contact plates 96, supportably interconnected to an outward-facing side of the substrate, for receiving a contact, second energy signal (e.g. a DC signal) to power the IC chip 92 for contact signal interface with a contact card reader via the plurality of contact plates 96, in compliance with ISO/IEC Standard 7816. In some arrangements, the card 100 may be provided so that the contact second energy signal is also provided to the first and second contact rails 160a, 160b for illumination of illuminable patch 170.

In that regard, the IC chip module 90 shown in FIG. 6 and described above may be employed. In turn, and with reference to both FIG. 6 and FIG. 8, different ones of the pair of contact pads 98a, 98b may be electrically interconnected via different ones of a third pair of interconnection lines 166a, 166b to different ones of the first and second contact rails 160a, 160b to provide the second electrical signal thereto. Each of the third pair of connection lines 166a, 166b may be supportably interconnected to the first side of the first carrier layer 140 with a corresponding metal pad 168a, 168b connected thereto and located in contact with a different corresponding one of said pair of contact pads 98a, 98b of the IC chip module 90.

The first antenna 180, the first and second contact rails 160a, 160b, the first pair of connection lines 162a, 162b, the second pair of connection lines 164a, 164b, and the third pair of connection lines 166a, 166b may be defined by metallization, printed electrically conductive ink, and/or a combination thereof. By way of example, the first antenna 180, the first and second contact rails 160a, 160b, the first pair of connection lines 162a, 162b, the second pair of connection lines 164a, 164b, and the third pair of connection lines 166a, 166b may be defined by aluminum and/or copper plating and etching operations.

Further, as discussed in relation to FIG. 4A and as shown in FIG. 8, the first and second contact rails 160a, 160b may allow for a plurality of placement locations of the illuminable patch 170 along the length of the contact rails 160a, 160b and relative to the card 100 itself. The first and second contact rails 160a, 160b may be in a substantially parallel relationship with each other and an edge of the card 100. The first and second contact rails 160a, 160b may also be in an alternative spaced relationship such as a bend or curve.

As shown in FIG. 8, either or both of the first pair of connection lines 162a, 162b that electrically interconnect the first antenna 180 to different ones of the first and second contact rails 160a, 160b may include an in-line capacitor 161 to isolate the first antenna 80 from the second electrical signal (e.g. DC signal of contact signal). As further shown, either or both of the third pair of connection lines 166a, 166b that electrically interconnect the pair of contact pads 198a, 198b of the IC chip module 90 to different ones of the first and second contact rails 160a, 160b may include an in-line diode 163 to isolate the IC chip 92 from the first energy signal (e.g. AC signal from contactless signal).

As shown in FIG. 8 electrical signals may be transmitted to the first and second contact rails 160a, 160b from both or either of contactless applications with an external device or from contact applications with an external device. Because contactless applications commonly utilize AC signals and because contact applications commonly utilize DC signals, the card 100 may include one or more filters 161, 163 between the first and second contact rails 160a, 160b and the corresponding features utilized for contactless applications, such as the first antenna 180, and contact applications, such as the IC chip module 90. The filters may include in-line capacitors 161 or in-line diodes 163 as shown in FIG. 8, or other similar components to limit the transmission of different electrical signal forms to certain components, such as a DC signal to the first antenna 180 or an AC signal to the IC chip module 90. By including filters 161, 163 the card 100 may be utilized for both contactless and contact applications and prevent damage to both the card 100 and an external device. Further, through the use of the filters 161, 163 the illuminable patch 170 may generate light during both contact and contactless applications.

Figure 9:
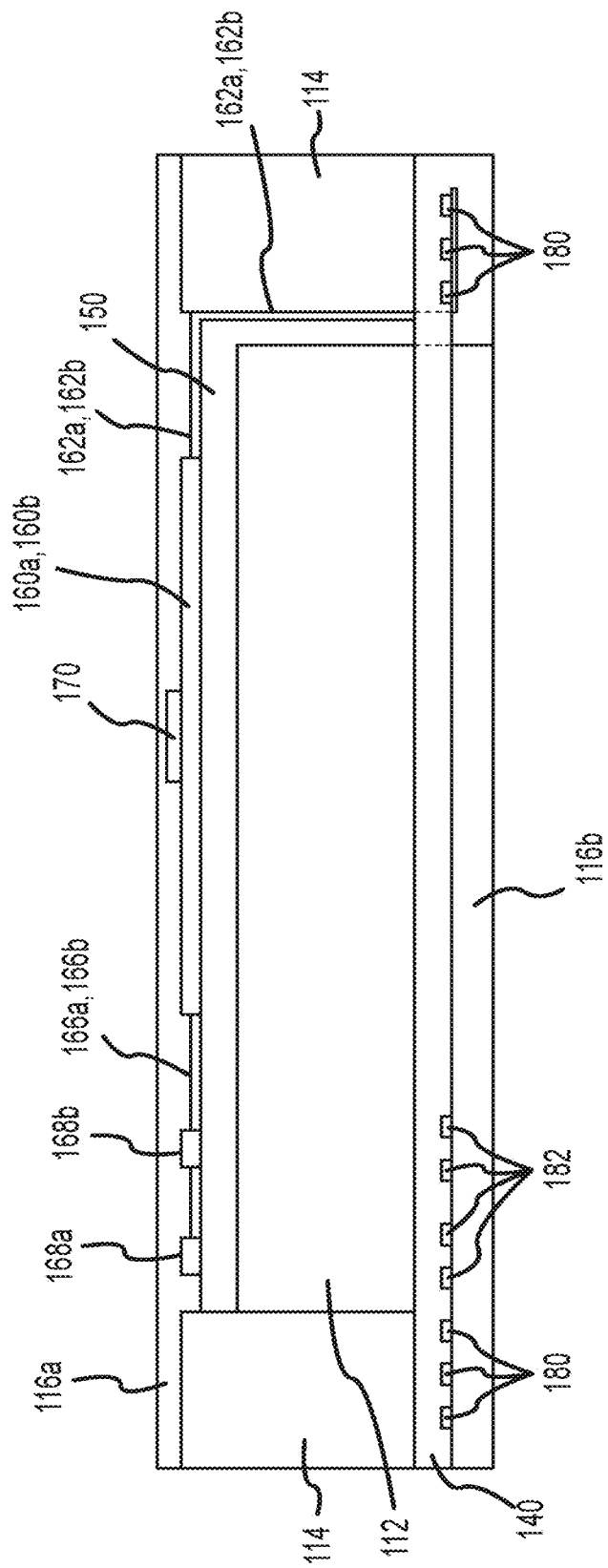
FIG. 9 is a schematic cross-sectional view of the card embodiment shown in FIG. 8, utilizing the inlay embodiment shown in FIG. 8.

Reference is now made to FIG. 9 which illustrates a schematic cross-sectional view of the card embodiment shown in FIGS. 7 and 8. In one implementation the various layers may be provided to have the following approximate thicknesses:

First outer layer 46: 0.002 in.;
First core layer 20 with first printing 22: 0.004 in. to 0.010 in.;
Inlay 110: 0.008 in. to 0.02 in.;
   First cover layer 116a: 0.002 in.;
   Surround member 114, and total of second carrier layer 150 with illuminable patch 170 (0.002 in. to 0.010 in.) and metal member 112 (0.004 in. to 0.010 in.): 0.006 in. to 0.020 in.;
   First carrier layer 140 with first antenna 180: 0.002 in. to 0.010 in.;
   Second cover layer 116b: 0.002 in;
Second core layer 48 with second printing: 0.004 in. to 0.010; and,
Second outer layer 48: 0.002 in.

The approximate total thickness of card may be within a range of about 0.030 in. to 0.033 in., with a weight within a range of about 8 gm. to 20 gm.

Figure 10:
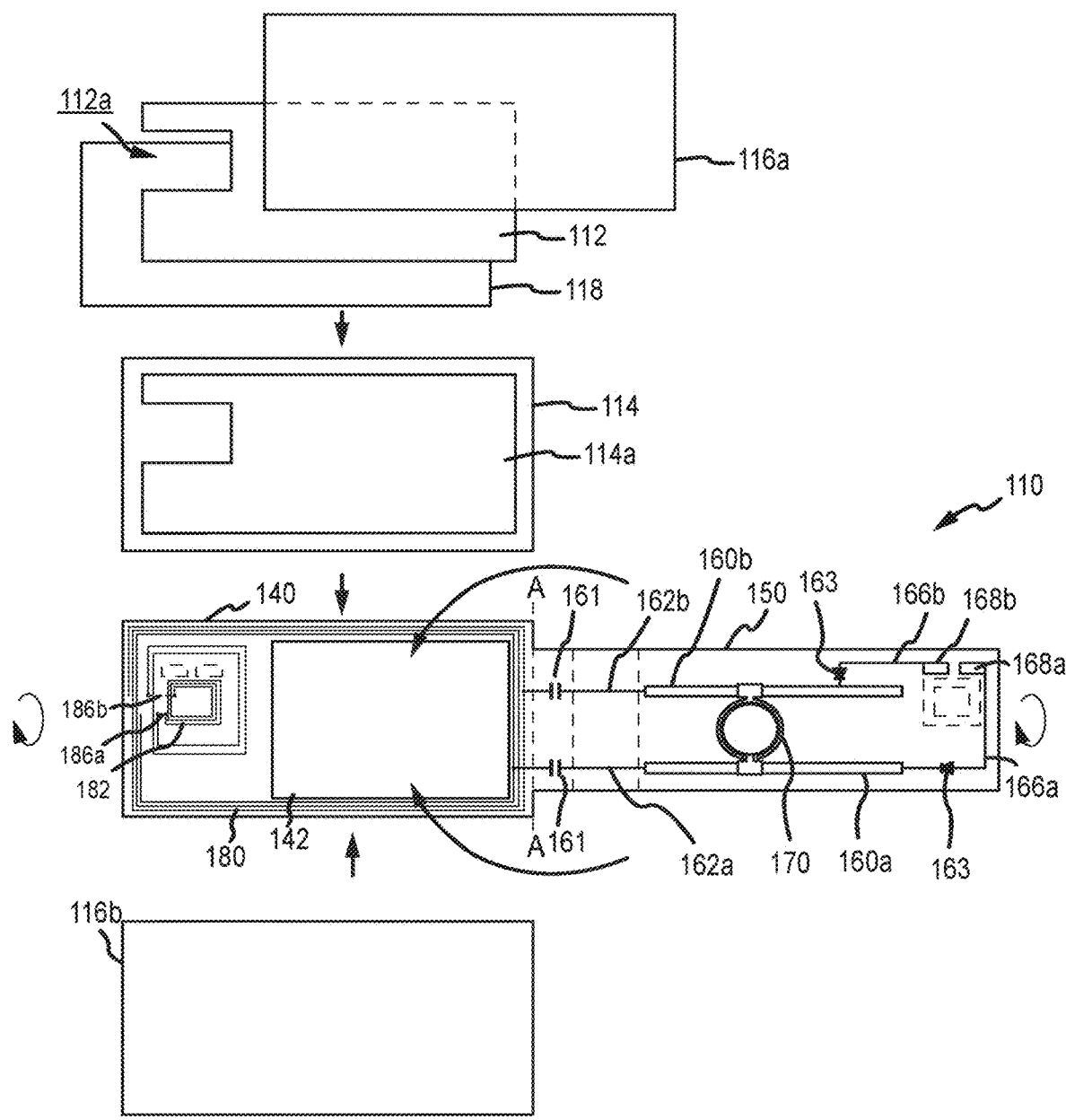
FIG. 10 is a top plan view of components of another embodiment of an inlay of the card embodiment shown in FIG. 7.

In a modified embodiment of card 100, the first antenna 180 may be provided without inclusion of the second pair of connection lines 164a, 164b shown in FIG. 8. Optionally, and as shown in FIG. 10, a second antenna 184 may be supportably interconnected to the first carrier layer 140 on the same side as first antenna 180, wherein the second antenna 184 may be provided for receiving a contactless signal and providing an additional electrical signal to the IC chip 92 in response thereto. For such purposes, the card 100 may include an electrically-conductive additional pair of connection lines 186a, 186b electrically interconnected at offset locations of the second antenna 184 for electrical coupling with different ones of the above-referenced first pair of the plurality of electrical contacts 92a of the IC chip 92 to provide the additional electrical signal thereto (e.g. via direct contact or inductive coupling), wherein the IC chip 92 may employ the additional energy signal provided by the second antenna 184 to power the IC chip 92 for contactless signal interface with a contactless card reader via the second antenna 184, in compliance with ISO/IEC Standard 14443. In another approach, the additional pair of electrical connection lines 186a, 186b may be electrically interconnected to corresponding contact pads for direct electrical coupling with corresponding electrical contacts supportably interconnected to the inward-facing side of the substrate of IC chip module 90 and electrically connected to different ones of the above-referenced first pair of the plurality of electrical contacts 92a of the IC chip 92 to provide the additional electrical signal thereto.

In the modified embodiment of FIG. 10, an isolation layer 118 may be located between the metal member 112 and the second antenna 184 to isolate reception of a contactless signal by the second antenna 184. In one approach the isolation layer may comprise a ferrite material. In some approaches, the isolation layer 118 may be provided with a pressure-sensitive adhesive on one or both sides, thereby facilitating attachment with the metal member 112 and/or the first carrier layer 140.

In the various described embodiments, the metal member 12, 112 may be substantially homogenous (e.g. a solid metal member), wherein the metal member 12, 112 may be a single piece member. For example, the metal member 12, 112 may comprise stainless steel, palladium, platinum, gold, silver, or tungsten. The metal member 12, 112 may also be formed from two or more separate distinct metal members, the two or more metal members 12, 112 may contribute to increase the overall weight of the card. In some examples the metal member 12, 112 may be entirely internal to the card 1, 100 or the metal member 12, 112 may be at least partially visible from an exterior of the card 1, 100. The metal member 12, 112 may also define one or more discontinuities such as to provide apertures, spaces, or other placement locations for different components of the card 1, 100.

The metal member 12, 112 may further be configured relative to the card 1, 100 in such a manner as to prevent overlap or electrical interference with one or more of the communication elements, such as the first antenna 80, 180 or the second antenna 84, 184. Metallic materials are known to interfere with the transmission of electrical signals generally. As a result metal members in contactless cards interfered with electrical signals transmitted to or from the card, inhibiting their functionality and preventing adoption of contactless metal cards. By configuring the metal member in such a manner as to prevent or reduce electrical interference, a metal member 12, 112 may be utilized in a card 1, 100 for contactless applications.

As noted, a weight of the metal member may comprise at least about 40% of the total weight of the card 1, 100. In some implementations the weight of the metal member may comprise at least about 50% of the total weight of the card 1, 100 and no more than about 80% of the total weight of the card 1, 100. In other implementations, the metal member may comprise a higher percentage of the total weight of the car 1, 100. In the described embodiments, the metal member 12, 112 may comprise a length at least about 50% of the length of the card 1, 100 and in some implementations, the length of the metal member 12, 112 may be at least about 70% of the length of the card 1, 100. In some embodiments, the metal member 12, 112 may comprise a width at least about 50% of the width of the card 1, 100.

In some examples, the metal member 12, 112 may shaped or of a sufficient length or width so as to be, or appear to be, coextensive with one or more of the length, width, or thickness of the card. For example, the metal member 12, 112 may be placed as a frame along one or more edges of the card 1, 100 to generate the appearance of an entirely or substantially entirely metal card.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A card, comprising:
    an electronics layer, the electronics layer defining a first side and a second side opposite the first side;
    an illuminable patch configured to couple to the first side of the electronics layer at a plurality of locations, wherein the illuminable patch generates light in response to an electrical signal;
    a communications element electrically coupled to the electronics layer and configured to receive electrical signals wirelessly, wherein the electrical signals received by the communications element provide power to the illuminable patch;
    one or more signal filters positioned electrically between the communications element and the illuminable patch, wherein the one or more signal filters are configured to limit forms of current transmitted between the communications element and the illuminable patch; and
    a metal member layer, wherein a portion of the metal member layer includes one or more metal members to provide a stiffness or weight to the card and is configured to couple to the second side of the electronics layer.

2. The card of claim 1, wherein the one or more metal members are positioned to prevent interference with the electrical signals received by the communications element.

3. The card of claim 1, further comprising:
    a power receiving element electrically coupled to the electronics layer; and
    the one or more signal filters positioned electrically between the power receiving element and the illuminable patch, wherein the one or more signal filters limit forms of current transmitted between the power receiving element and the illuminable patch.

4. The card of claim 1, wherein:
the one or more signal filters electrically coupled to the electronics layer, wherein the one or more signal filters are configured to limit the forms of current transmitted to, from, or through the electronics layer.

5. The card of claim 1, wherein the electronics layer includes a first and second contact rail on the first side, where the first and second contact rail are configured to couple with the illuminable patch and to transmit electrical signals to the illuminable patch.

6. The card of the claim 5, wherein:
the communications element electrically isolated from the one or more metal members and electrically connected at offset locations to the first and second contact rails, for receiving a contactless signal and providing the electrical signal to the first and second contact rails in response to the contactless signal.

7. The card of claim 5, further comprising:
a first carrier layer, where the first carrier layer defines the top most layer of the card on the first side of the electronics layer and further defines an opening to a portion of the electronics layer;
a second carrier layer, where the second carrier layer is defined as a layer coupled to the metal member layer on a side opposite the electronics layer;
an integrated chip module, wherein the integrated chip module is placed within the opening of the first carrier layer and electrically couples to the electronics layer and is further configured to transmit or receive electrical signals from a first external device, where the integrated chip module further includes:
one or more contact plates, where the contact plates are configured to electrically contact the first external device; and
one or more of the communication elements electrically coupled with the integrated chip module, wherein the one or more communications elements are configured to extend around the perimeter of one or more of the layers and to receive or transmit contactless electrical signals to or from a second external device.

8. The card of claim 7, further comprising:
one or more connection lines, wherein the connection lines provide for the transmission of the electrical signal from the contact plates or communication elements to the first and second contact rails to provide power to the illuminable patch, the plurality of connection lines further including:
one or more signal filters electrically positioned between the contact plates and the illuminable patch and between the communication elements and the illuminable patch, wherein the one or more signal filters limit forms of the electrical signals being transmitted or received by the one or more communication elements, contact plates, or integrated chip module.

9. The card of claim 7, wherein the one or more metal members are in non-overlapping relation with the one or more communication elements and where the first carrier layer, second carrier layer, and electronics layers are coextensive.

10. The card of claim 5, further comprising:
a carrier layer, the carrier layer including:

a first portion, the first portion configured to couple to the electronics layer on a first side and defining an opening on through a second side to the electronics layer,
a second portion, the second portion configured to couple to the metal member layer on a first side of the second portion,
an edge, wherein the edge defines the intersection between the first and second portions and is movable to allow the first side of the first portion to couple to the first side of the second portion;
an integrated chip module, wherein the integrated chip module is placed within the opening of the first portion and electrically couples to the electronics layer and is further configured to transmit or receive electrical signals from a first external device, where the integrated chip module further includes:
one or more contact plates, where the contact plates are configured to contact the first external device; and
one or more of the communication elements electrically coupled with the integrated chip module, wherein the one or more communication elements are configured to extend from the second portion to the electronics layer through the edge and to receive or transmit contactless electrical signals to or from a second external device.

11. The card of claim 10, further comprising:
one or more connection lines, wherein the connection lines provide for the transmission of the electrical signals from the contact plates or antennas to the first and second contact rails to power the illuminable patch, the plurality of connection lines further including:
the one or more signal filters electrically positioned between the contact plates and the illuminable patch, wherein the one or more signal filters limit unwanted forms of the electrical signals from being transmitted or received by the communication elements, contact plates, or integrated chip module.

12. The card of claim 11, wherein the one or more metal members are in non-overlapping relation with the one or more communication elements and where the first carrier layer, second carrier layer, and electronics layers are coextensive.

13. The card of claim 1, further comprising:
a light transmissive layer, the light transmissive layer coupled to the illuminable patch and having translucent or phosphorescent properties, the light transmissive layer further configured to transmit light to an externally visible location of the card.

14. The card of claim 1, further comprising:
a mask, the mask placed in a vertically spaced relationship with the illuminable patch and in a direction of light emission from the illuminable patch, wherein the mask is configured to permit or block the emission of light from the illuminable patch to generate an externally visible image.

15. A card comprising:
an electronics layer, the electronics layer defining a first side and a second side opposite the first side;
an illuminable patch configured to couple to the first side to the electronics layer at a plurality of locations, wherein the illuminable patch generates light in response to an electrical signal;
a communications element electrically coupled to the card and configured to receive electrical signals wirelessly, wherein the electrical signals received by the communications element provides power to the illuminable patch; and one or more signal filters positioned electrically between the communications element and the illuminable patch, wherein the one or more signal filters are configured to limit forms of current transmitted between the communications element and the illuminable patch.

16. The card of claim 15, wherein the electronics layer includes a first and second contact rail, where the first and second contact rail are configured to couple with the illuminable patch on the first side of the electronics layer and to transmit electrical signals to or from the illuminable patch and where the first and second contact rails are positioned electrically between the one or more signal filers and the illuminable patch.

17. The card of claim 15, further comprising:
a metal member layer, wherein a portion of the metal member layer includes one or more metal members to provide a stiffness or weight to the card and is configured to couple to the second side of the electronics layer and wherein the one or more metal members are in non-overlapping relation with the communication element.

* * * * *